(12) United States Patent
Tokuda et al.

(10) Patent No.: US 12,043,900 B2
(45) Date of Patent: Jul. 23, 2024

(54) PLATED STEEL MATERIAL

(71) Applicant: NIPPON STEEL CORPORATION, Tokyo (JP)

(72) Inventors: Kohei Tokuda, Tokyo (JP); Mamoru Saito, Tokyo (JP); Takuya Mitsunobu, Tokyo (JP); Tetsuya Toba, Tokyo (JP); Yasuto Goto, Tokyo (JP); Atsushi Morishita, Tokyo (JP); Yasuaki Kawamura, Tokyo (JP); Fumiaki Nakamura, Tokyo (JP); Koji Kawanishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/271,990

(22) PCT Filed: Nov. 30, 2021

(86) PCT No.: PCT/JP2021/043848
§ 371 (c)(1),
(2) Date: Jul. 12, 2023

(87) PCT Pub. No.: WO2022/153694
PCT Pub. Date: Jul. 21, 2022

(65) Prior Publication Data
US 2024/0043980 A1 Feb. 8, 2024

(30) Foreign Application Priority Data
Jan. 18, 2021 (JP) .................................. 2021-005575

(51) Int. Cl.
*C23C 2/06* (2006.01)

(52) U.S. Cl.
CPC ..................................... *C23C 2/06* (2013.01)

(58) Field of Classification Search
CPC ...................................................... C23C 2/06
See application file for complete search history.

(56) References Cited

U.S. PATENT DOCUMENTS

| 6,235,410 B1 | 5/2001 | Komatsu et al. |
| 6,465,114 B1 | 10/2002 | Honda et al. |
| 2019/0390303 A1* | 12/2019 | Tokuda ..................... C23C 2/06 |

FOREIGN PATENT DOCUMENTS

| JP | 10-226865 A | 8/1998 |
| WO | WO 00/71773 A1 | 11/2000 |
| WO | WO 2018/139619 A1 | 8/2018 |

* cited by examiner

*Primary Examiner* — Hai Y Zhang
(74) *Attorney, Agent, or Firm* — Birch, Stewart, Kolasch & Birch, LLP

(57) ABSTRACT

A plated steel material having a plating layer having an average chemical composition containing, in mass %, Zn: more than 50.00%, Al: more than 15.0% and less than 30.0%, Mg: more than 5.0% and less than 15.0%, and Si: 0.25% or more and less than 3.50%, and impurities, and wherein a total amount (ΣA) of at least one selected from the group consisting of Sn, Bi and In is less than 1.00%, a total amount (ΣB) of at least one selected from the group consisting of Ca, Y, La, Ce and Sr is 0.02% or more and less than 0.60%, 2.0≤SMg/Si<20.0 (Formula 1), 3.0≤Si/ΣB<24.0 (Formula 2), and 26.0≤(Si/ΣB)×(Mg/Si)<375.0 (Formula 3) are satisfied, and in an X-ray diffraction pattern of the surface of the plating layer, a diffraction intensity ratio R1 defined by R1={I(16.18°)+I(32.69°)}/I(27.0°) (Formula 4) satisfies 2.5<R1 (Formula 5) is used.

8 Claims, 1 Drawing Sheet

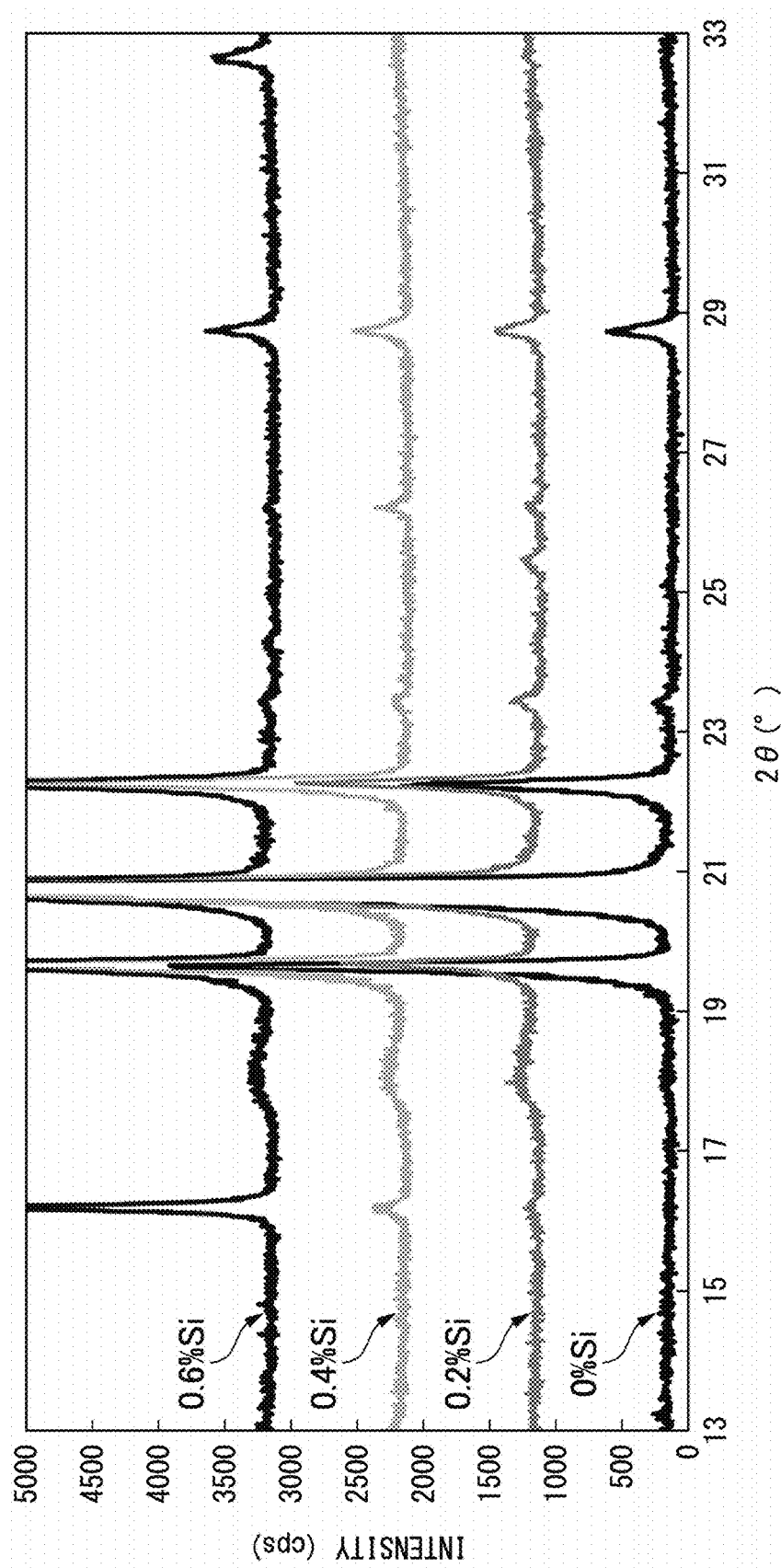

PLATED STEEL MATERIAL

TECHNICAL FIELD

The present invention relates to a plated steel material.

Priority is claimed on Japanese Patent Application No. 2021-005575, filed Jan. 18, 2021, the content of which is incorporated herein by reference.

BACKGROUND ART

Many metal materials are used as building materials. For exterior materials, wall materials, and roofing materials used for a particularly long time, titanium materials, stainless steel materials, aluminum materials and the like are used as high-grade metal materials. These materials are generally materials which have a passive film on the metal surface and are less likely to corrode and less likely to change in appearance in outdoor environments for a long time, but they are very expensive and tend to increase application costs.

On the other hand, since iron is relatively inexpensive, iron materials such as zinc plated steel sheets, Al plated steel sheets, and Galvalume steel sheets (registered trademark) are used as building materials. Among these, the Al plated steel sheet has, for example, an Al layer or Al—Zn alloy layer having a thickness of about 20 m on the surface of the steel sheet, and has a weak sacrificial corrosion-preventive action unlike the zinc plated steel sheets because a large amount of Al is present on the outermost surface compared to the base material iron. Therefore, in the Al plated steel sheets, an anti-corrosion treatment is required for areas in which the steel sheet (base iron) is exposed such as processed parts and cut end surface parts, and in salt-damaging areas, there is a risk of the Al passive film being destroyed and corrosion progressing, and furthermore, there is a problem that it is not suitable for use in environments such as cow barns and pig barns where alkaline wastewater is discharged.

These problems can be somewhat solved by using highly corrosion-resistant Zn-based plated steel sheets, for example, those disclosed in Patent Document 1, Patent Document 2, or Patent Document 3, but because the Zn-based plated steel sheets have a stronger sacrificial corrosion-preventive action than Al-based plated steel sheets, the occurrence of white rust and discoloration due to corrosion is likely to be conspicuous. Therefore, it tends to be unlikely for a favorable appearance to be maintained over a long time in Zn-based plated steel sheets, which can be expected for, for example, Al plated steel sheets and Galvalume steel sheets (registered trademark).

In order to maintain the appearance over a long time, it is conceivable to apply a color coating treatment or the like to the Zn plated steel sheet. However, the coating treatment may cause the Zn plated steel sheet to lose its metallic luster, the cost to increase due to an increase in the number of processes, and the color to fade due to peeling off of the coating and deterioration of weather resistance. Therefore, there is a demand for a Zn plated steel material that has a strong sacrificial corrosion-preventive action, has high versatility, and additionally can maintain metallic luster for a long time.

CITATION LIST

Patent Document

[Patent Document 1]
Japanese Unexamined Patent Application, First Publication No. H10-226865
[Patent Document 2]
PCT International Publication No. WO 2000/71773
[Patent Document 3]
PCT International Publication No. WO 2018/139619

SUMMARY OF THE INVENTION

Problems to be Solved by the Invention

The present invention has been made in view of the above circumstances, and an object of the present invention is to provide a Zn-based plated steel material with little change in appearance particularly over a long time.

Means for Solving the Problem

In order to address the above problem, the present invention provides the following configuration.

[1] A plated steel material having a plating layer on a surface of a steel material,
in which the plating layer has an average chemical composition consisting of, in mass %,
Zn: more than 50.00%,
Al: more than 15.0% and less than 30.0%,
Mg: more than 5.0% and less than 15.0%,
Si: 0.25% or more and less than 3.50%,
Sn: 0% or more and less than 1.00%,
Bi: 0% or more and less than 1.00%,
In: 0% or more and less than 1.00%,
Ca: 0% or more and less than 0.60%,
Y: 0% or more and less than 0.60%,
La: 0% or more and less than 0.60%,
Ce: 0% or more and less than 0.60%,
Sr: 0% or more and less than 0.60%,
Cr: 0% or more and less than 0.25%,
Ti: 0% or more and less than 0.25%,
Ni: 0% or more and less than 0.25%,
Co: 0% or more and less than 0.25%,
V: 0% or more and less than 0.25%,
Nb: 0% or more and less than 0.25%,
Zr: 0% or more and less than 0.25%,
Mo: 0% or more and less than 0.25%,
W: 0% or more and less than 0.25%,
Ag: 0% or more and less than 0.25%,
Cu: 0% or more and less than 0.25%,
Mn: 0% or more and less than 0.25%,
Fe: 0% or more and less than 5.0%,
Sb: 0% or more and 0.5% or less,
Pb: 0% or more and 0.5% or less,
B: 0% or more and 0.5% or less,
P: 0% or more and 0.5% or less, and
impurities,
in which a total amount ($\Sigma A$) of at least one selected from the group consisting of Sn, Bi and In is less than 1.00%,
a total amount ($\Sigma B$) of at least one selected from the group consisting of Ca, Y, La, Ce and Sr is 0.02% or more and less than 0.60%,
the amount of Mg, the amount of Si and $\Sigma B$ satisfy the following Formula 1 to Formula 3, and in an X-ray diffraction pattern of the surface of the plating layer measured using a Cu-Kα ray under conditions of an X-ray output of 40 kV and 150 mA, a diffraction intensity ratio R1 defined by the following Formula 4 satisfies the following Formula 5:

$$2.0 \leq Mg/Si < 20.0 \quad \text{Formula 1}$$

$$3.0 \leq Si/\Sigma B < 24.0 \quad \text{Formula 2}$$

$$26.0 \leq (Si/\Sigma B) \times (Mg/Si) < 375.0 \quad \text{Formula 3}$$

$$R1 = \{I(16.18°) + I(32.69°)\}/I(27.0°) \quad \text{Formula 4}$$

$$2.5 < R1 \quad \text{Formula 5}$$

where, Si and Mg in Formula 1 to Formula 3 are the average composition (mass %) of Si and Mg in the plating layer, in Formula 4, I(16.18°) is a diffraction intensity (cps) at 2θ=16.18° in the X-ray diffraction pattern, I(32.69°) is a diffraction intensity (cps) at 2θ=32.69° in the X-ray diffraction pattern, and I(27.0°) is a diffraction intensity (cps) at 2θ=27.0° in the X-ray diffraction pattern, and when a diffraction peak with an intensity of 1,000 cps or more appears at 2θ=27.0°, I(27.0°) in Formula 4 is 585 cps.

[2] The plated steel material according to [1], in which, in an X-ray diffraction pattern of the surface of the plating layer measured using a Cu-Kα ray under conditions of an X-ray output of 40 kV and 150 mA, a diffraction intensity ratio R2 defined by the following Formula 6 satisfies the following Formula 7:

$$R2 = \{I(24.24°) + I(28.07°)\}/I(27.0°) \quad \text{Formula 6}$$

$$2.5 < R2 \quad \text{Formula 7}$$

where, in Formula 6, I(24.24°) is a diffraction intensity (cps) at 2θ=24.240 in the X-ray diffraction pattern, I(28.07°) is a diffraction intensity (cps) at 2θ=28.07° in the X-ray diffraction pattern, and I(27.0°) is a diffraction intensity (cps) at 2θ=27.0° in the X-ray diffraction pattern, and when a diffraction peak with an intensity of 1,000 cps or more appears at 2θ=27.0°, I(27.0°) in Formula 6 is 585 cps.

[3] The plated steel material according to [1] or [2], in which R1 defined by Formula 4 satisfies the following Formula 8:

$$10 < R1 \quad \text{Formula 8}$$

[4] The plated steel material according to any one of [1] to [3], which satisfies the following Formula 9:

$$3.0 \leq Si/\Sigma A < 50.0 \quad \text{Formula 9}$$

where, Si in Formula 9 is the average composition (mass %) of Si in the plating layer.

Effects of the Invention

According to the present invention, it is possible to provide a Zn-based plated steel material with little change in appearance particularly over a long time. In particular, the present invention can provide a favorable plated steel material with little change in appearance over a long time even when used outdoors.

BRIEF DESCRIPTION OF DRAWINGS

FIG. 1 is an X-ray diffraction diagram of a surface of a plating layer of a plated steel material according to an embodiment of the present invention.

EMBODIMENTS FOR IMPLEMENTING THE INVENTION

Among Zn-based plated steel materials, Zn—Al—Mg-based plated steel materials represented by highly corrosion-resistant plating have a strong sacrificial corrosion-preventive action, and gradually form a thin rust layer on the surface of the plating layer as they corrode. Therefore, when the Zn—Al—Mg-based plated steel material is used in an outdoor environment or the like, since it is unlikely for its metallic luster to be maintained, about a year after application, a slight change in appearance from the initial application such as loss of metallic luster is confirmed. The cause of change in appearance of the Zn—Al—Mg-based plated steel material is that a passive film ($Al_2O_3$) such as an Al-based plating layer is not sufficiently formed on the surface of the plating layer, and in a part in which there is no passive film, the surface of the plating layer is likely to corrode, which causes a change in the appearance. That is, a plating layer having a high sacrificial corrosion resistance has opposite properties of being easily eluted, easily corroded, and easily changed in appearance.

Among Zn-based plated steel materials, for example, the Galvalume steel sheet (registered trademark) contains a large amount of Al in the Zn plating layer and thus a passive film can be formed to some extent on the surface of the plating layer, but, on the other hand, it contains a large amount of Al, an amount of Zn is relatively reduced, and sacrificial corrosion resistance is almost lost. That is, a plating layer in which its surface appearance is unlikely to change has an opposite effect of being weak in sacrificial corrosion resistance.

Therefore, when a compound that forms a passive film on the surface of the plating layer is present on the plating layer while a low Al concentration is maintained in the plating layer, a change in appearance being minimized during corrosion of the plating layer has been examined. In a plating layer containing a large amount of such a compound, a dense oxide film is formed on the surface layer and it is expected that a change in appearance will be less likely to occur during corrosion (metallic luster of a plating metal is maintained). The inventors conducted extensive studies and found that, in the case of a Zn—Al—Mg-based plated steel material, when a Si-based compound is present on the plating layer, a dense oxide film can be formed.

However, when Si and Mg are present together in the Zn-based plating layer, a compound such as $Mg_2Si$ that is not involved in the formation of an oxide film is generated, and generation of a Si-based compound that forms an oxide film is inhibited and thus it is necessary to control $Mg_2Si$ such that it has an appropriate precipitation form.

On the other hand, $Mg_2Si$ increases sacrificial corrosion resistance because a large amount of Mg is bound to Si, and generally the appearance is likely to change. Since $Mg_2Si$ itself is a substance that contributes to sacrificial corrosion resistance, it is an intermetallic compound that promotes blackening itself, but if its precipitation form is controlled, it corrodes uniformly, and has an effect of preventing so-called blackening in which the surface of the plating layer turns black due to an oxide film involving Si that is formed at the same time. Therefore, the inventors additionally conducted extensive studies and found a component composition of a plating layer in which a dense oxide film can be sufficiently formed on the surface without reducing a blackening prevention effect according to $Mg_2Si$ and a method of forming a plating layer.

Hereinafter, a plated steel material according to an embodiment of the present invention will be described.

A plated steel material according to an embodiment of the present invention is a plated steel material having a plating layer on a surface of a steel material, in which the plating layer has an average chemical composition consisting of, in mass %, Zn: more than 50.00%, Al: more than 15.0% and less than 30.0%, Mg: more than 5.0% and less than 15.0%, Si: 0.25% or more and less than 3.50%, Sn: 0% or more and less than 1.00%, Bi: 0% or more and less than 1.00%, In: 0% or more and less than 1.00%, Ca: 0% or more and less than 0.60%, Y: 0% or more and less than 0.60%, La: 0% or more and less than 0.60%, Ce: 0% or more and less than 0.60%, Sr: 0% or more and less than 0.60%, Cr: 0% or more and less than 0.25%, Ti: 0% or more and less than 0.25%, Ni: 0% or more and less than 0.25%, Co: 0% or more and less than 0.25%, V: 0% or more and less than 0.25%, Nb: 0% or more and less than 0.25%, Zr: 0% or more and less than 0.25%, Mo: 0% or more and less than 0.25%, W: 0% or more and less than 0.25%, Ag: 0% or more and less than 0.25%, Cu: 0% or more and less than 0.25%, Mn: 0% or more and less than 0.25%, Fe: 0% or more and less than 5.0%, Sb: 0% or more and 0.5% or less, Pb: 0% or more and 0.5% or less, B: 0% or more and 0.5% or less, P: 0% or more and 0.5% or less, and impurities, in which a total amount ($\Sigma A$) of at least one selected from the group consisting of Sn, Bi and In is less than 1.00%, a total amount (XB) of at least one selected from the group consisting of Ca, Y, La and Ce is 0.02% or more and less than 0.60%, the amount of Mg, the amount of Si and $\Sigma B$ satisfy the following Formula 1 to Formula 3, and in an X-ray diffraction pattern of the surface of the plating layer measured using a Cu-K$\alpha$ ray under conditions of an X-ray output of 40 kV and 150 mA, a diffraction intensity ratio R1 defined by the following Formula 4 satisfies the following Formula 5.

$$2.0 \leq Mg/Si < 20.0 \quad \text{Formula 1}$$

$$3.0 \leq Si/\Sigma B < 24.0 \quad \text{Formula 2}$$

$$26.0 \leq (Si/\Sigma B) \times (Mg/Si) < 375.0 \quad \text{Formula 3}$$

$$R1 = \{I(16.18°) + I(32.69°)\}/I(27.0°) \quad \text{Formula 4}$$

$$2.5 < R1 \quad \text{Formula 5}$$

Here, Si and Mg in Formula 1 to Formula 3 are the average composition (mass %) of Si and Mg in the plating layer, and in Formula 4, I(16.18°) is a diffraction intensity at 2θ=16.18° in the X-ray diffraction pattern, I(32.69°) is a diffraction intensity at 2θ=32.690 in the X-ray diffraction pattern, and I(27.0°) is a diffraction intensity at 2θ=27.0° in the X-ray diffraction pattern. Here, when a diffraction peak with an intensity of 1,000 cps or more appears at 2θ=27.0°, I(27.0°) in Formula 4 is 585 cps.

In the following description, "%" of the amount of each element in the chemical composition means "mass %."

In addition, when a numerical value range is indicated using "to," the range includes numerical values stated before and after "to" as a lower limit value and an upper limit value.

In addition, a numerical value range when "more than" or "less than" is attached to numerical values stated before and after "to" means a range that does not include these numerical values as a lower limit value or an upper limit value. In addition, respective components of the following embodiment can be combined with each other.

In addition, "corrosion resistance" is a property of the plating layer itself being resistant to corrosion. Here, since the plating layer according to the present embodiment has a sacrificial corrosion-preventive action on the steel material, the corrosion procedure includes a procedure in which the plating layer corrodes and turns into white rust before the steel material corrodes, the white rusted plating layer additionally disappears, and the steel material then corrodes and red rust occurs.

Here, the passive film present on the surface of the plating layer according to the present embodiment is an oxide film, its thickness is less than 1 μm at most and is about several nm in many cases, and it is difficult to confirm whether the film is present in analysis using an SEM (reflection electron microscope). It is speculated that it is possible to determine formation using a transmission electron microscope (TEM) and XPS analysis, but both TEM and XPS have a narrow observation field of view, and there is a problem in quantification. Therefore, in the present embodiment, the presence of film formation is indirectly confirmed by identifying a compound involved in the formation of an oxide film by X-ray diffraction.

First, a steel material to be plated will be described.

The shape of the steel material is not particularly limited, and the steel material may include, in addition to steel sheets, steel pipes, civil engineering and building materials (fences, corrugated pipes, drain covers, sand prevention sheets, bolts, wire nets, guardrails, water cut-off walls, etc.), prefabricated members, housing walls, roofing materials, home appliance components (housings for outdoor units of air conditioners, etc.), automobile outer panels, automobile parts (suspension members, etc.), and materials for steel structural members molded by welding.

The base sheet material of the steel material is not particularly limited. For the steel material, for example, various steel materials such as general steels, Ni pre-plated steels, Al killed steels, ultra-low carbon steels, high carbon steels, various high-tensile steels, and some high-alloy steels (steels containing corrosion-resistance strengthening elements such as Ni and Cr, etc.) can be applied. In addition, the steel material is not particularly limited in terms of conditions such as a steel material producing method and a steel sheet producing method (a hot rolling method, a pickling method, a cold rolling method, etc.). In addition, for the steel material, a pre-plated steel material obtained by pre-plating the above steel material with a plating layer of less than 1 μm such as Zn, Ni, Sn, or an alloy thereof in advance may be used.

Next, the plating layer will be described. The plating layer according to the present embodiment includes a Zn—Al—Mg-based alloy layer. When an alloy element such as Al or Mg is added to Zn, the corrosion resistance is improved and thus a thin film, for example, about half of a general Zn plating layer, has the same corrosion resistance, and thus the present invention also secures corrosion resistance equal to or higher than that of the Zn plating layer with a thin film in the same manner. In addition, the plating layer may include an Al—Fe-based alloy layer.

The Zn—Al—Mg-based alloy layer is made of a Zn—Al—Mg-based alloy. The Zn—Al—Mg-based alloy means a ternary alloy containing Zn, Al and Mg. In addition, the Al—Fe-based alloy layer is an interface alloy layer between the steel material and the Zn—Al—Mg-based alloy layer.

That is, the plating layer may have a single-layer structure of a Zn—Al—Mg-based alloy layer or a laminated structure including a Zn—Al—Mg-based alloy layer and an Al—Fe-based alloy layer. In the case of a laminated structure, the Zn—Al—Mg-based alloy layer may be a layer constituting the surface of the plating layer. An oxide film formed by oxidizing elements constituting the plating layer and having a thickness of less than 1 μm is present on the outermost surface of the plating layer. Since this oxide film has favorable barrier properties and high corrosion resistance, the plating layer maintains metallic luster and its appearance is less likely to change.

Here, in the case of conventional Galvalume steel sheets (registered trademark), since the Zn plating layer contains a large amount of Al, the Al phase on the surface layer of the plating layer forms an oxide film, the plating layer has high corrosion resistance. On the other hand, Zn, Mg and the like contained in the plating layer of the present embodiment are also elements that form a passive film, but because these metals are relatively active metals compared to Al, passive films formed from Zn and Mg have a weak barrier property and are easily damaged unless the thickness is sufficiently secured and thus passive films formed from Zn and Mg generally easily corrode and easily change in appearance. Therefore, since a Zn- or Mg-based passive film is mainly formed in a plating layer with a reduced Al concentration, it is necessary to improve the barrier property by some kind of treatment. An oxide film formed on the surface of the plating layer of the plated steel material according to the present embodiment is presumed to be composed of an Al—Si—O-based intermetallic compound contained in the plating layer in addition to $Al_2O_3$ which is an oxide of Al contained in the plating layer, and has high corrosion resistance and little change in appearance.

When the Al—Fe-based alloy layer is present in the plating layer, the Al—Fe-based alloy layer binds the steel material and the Zn—Al—Mg-based alloy layer. The thickness of the interface alloy layer including the Al—Fe-based alloy layer can be arbitrarily controlled by the plating bath temperature during production of the plated steel material and the immersion time in the plating bath. In a method of producing a melt plated steel sheet centered on the Sendzimir method, because the Zn—Al—Mg-based alloy layer is the main part of the plating layer, and the thickness of the Al—Fe-based alloy layer is sufficiently small, the effect of the plating layer on corrosion resistance is small and the Al—Fe-based alloy layer is formed in the vicinity of the interface, and thus it hardly affects corrosion resistance at the initial stage of corrosion and the appearance of the plating layer.

The Al—Fe-based alloy layer is formed on the surface of the steel material (specifically, between the steel material and the Zn—Al—Mg-based alloy layer) and is a layer whose main phase is the $Al_5Fe$ phase as a structure. The Al—Fe-based alloy layer is formed by mutual atom diffusion between the base iron (steel material) and the plating bath. When a melt plating method is used as a production method, an Al—Fe-based alloy layer is easily formed in the plating layer containing Al. Since the plating bath contains Al at a certain concentration or more, the $Al_5Fe$ phase whose proportion is the largest is formed. However, some time is taken for atom diffusion and there are parts in which the Fe concentration is high in parts close to the base iron.

Therefore, the Al—Fe-based alloy layer may partially contain a small amount of an AlFe phase, an $Al_3Fe$ phase, an $Al_5Fe2$ phase or the like. In addition, since the plating bath contains Zn at a certain concentration, the Al—Fe-based alloy layer also contains a small amount of Zn.

Although the plating layer according to the present embodiment contains Si, Si is particularly likely to be incorporated into the Al—Fe-based alloy layer and may form an Al—Fe—Si intermetallic compound phase. The identified intermetallic compound phase includes an AlFeSi phase, and α, β, q1, q2-AlFeSi phases and the like are present as isomers. Therefore, in the Al—Fe-based alloy layer, these AlFeSi phases and the like may be detected. The Al—Fe-based alloy layer containing these AlFeSi phases and the like is also called an Al—Fe—Si-based alloy layer.

Since the thickness of the entire plating layer depends on plating conditions, the upper limit and the lower limit of the thickness of the entire plating layer are not particularly limited. In particular, a change in appearance of the plating over time when used outdoors in an atmospheric environment is only related to the condition of the plating layer with a surface layer of several m because corrosion of the plating layer is very gradual and is not easily affected by its thickness. In addition, for example, the thickness of the entire plating layer is related to the viscosity and specific gravity of the plating bath in a general melt plating method. In addition, the plating amount is adjusted based on the basis weight according to a drawing rate of the steel material (plating base sheet) and the intensity of wiping.

Next, the average chemical composition of the plating layer will be described. When the plating layer has a single-layer structure of a Zn—Al—Mg-based alloy layer, the average chemical composition of the entire plating layer is an average chemical composition of the Zn—Al—Mg-based alloy layer. In addition, when the plating layer has a structure in which an Al—Fe-based alloy layer and a Zn—Al—Mg-based alloy layer are laminated, the average chemical composition of the entire plating layer is an average chemical composition of a total of the Al—Fe-based alloy layer and the Zn—Al—Mg-based alloy layer.

Usually, in the melt plating method, the chemical composition of the Zn—Al—Mg-based alloy layer is almost the same as that of the plating bath because the formation reaction of the plating layer is almost completed in the plating bath. In addition, in the melt plating method, the Al—Fe-based alloy layer is formed and grown instantaneously immediately after immersion in the plating bath. Furthermore, the Al—Fe-based alloy layer has completed its formation reaction in the plating bath and its thickness is often sufficiently smaller than that of the Zn—Al—Mg-based alloy layer. Therefore, unless a special heat treatment such as a heat alloying treatment after plating, the average chemical composition of the entire plating layer is substantially equal to the chemical composition of the Zn—Al—Mg-based alloy layer, and components such as the Al—Fe alloy layer are negligible.

Hereinafter, elements contained in the plating layer will be described. In the present embodiment, in order to sufficiently form an Al—Si—O-based intermetallic compound, the component composition of the plating layer is important. If the component composition of the plating layer is outside the range described below, a compound other than the Al—Si—O-based compound, for example, an Al—Ca—Si-based compound or $Mg_2Si$, which is a compound that does not participate in the formation of an oxide film containing Si on the surface of the plating layer, is preferentially obtained, and predetermined performance cannot be obtained.

Zn: More than 50.00%

The plated steel material according to the present embodiment is a Zn-based plated steel material with high versatility, and contains a certain amount or more of Zn in order to secure sacrificial corrosion resistance. Thereby, an appropriate sacrificial corrosion resistance is imparted to the steel material. For example, even in an environment in which a cut end surface of 1.6 mm or more is open, if the amount of Zn is more than 50.00%, a sufficient sacrificial corrosion resistance effects is exhibited in a cut end surface part, and high corrosion resistance can be maintained. If the Zn content is 50.00% or less, the corrosion resistance may deteriorate depending on the thickness of the plating layer such as a case in which the cut end surface is open. Therefore, the Zn content is set to more than 50.00%. The Zn content is preferably 65.00% or more and more preferably more than 70.00%. The upper limit of the Zn content is not particularly limited, but if the Zn content is too large, the amount of other alloy elements relatively decreases, and it may be, for example, 80.00% or less.

Al: More than 15.0% and Less than 30.0%

Like Zn, Al is an element that constitutes the main body of the plating layer. In the Zn—Al—Mg-based plating, Al mainly forms an Al phase in the plating layer. The Al phase also exists on the surface of the plating layer and forms an $Al_2O_3$ film around the Al phase. On the other hand, the amount of the Al phase contained in the plating layer according to the present embodiment cannot form an oxide film that covers the entire surface of the plating layer. That is, if the Al content is 15.0% or less, a sufficient Al content to form an Al—Si—O-based compound, which is a compound that forms an oxide film, is not reached, and the Al—Si—O-based compound cannot be detected in the plating layer. On the other hand, if the Al content is 30.0% or more, since the sacrificial corrosion resistance decreases as described above, the Al content is set to less than 30.0%. A preferable Al content is 17.0% or more or 20.0% or more, and a preferable Al content is 29.0% or less or 25.0% or less.

Mg: More than 5.0% and Less than 15.0%

Mg is an element that has a sacrificial corrosion-preventive effect and improves corrosion resistance. High corrosion resistance and high sacrificial corrosion resistance of the plated steel material according to the present embodiment are achieved according to the inclusion of Mg. If the Mg content is insufficient, the sacrificial corrosion-preventive effect tends to become weak, and the corrosion resistance tends to decrease and thus the lower limit is set to more than 5.0%. On the other hand, if the Mg content is 15.0% or more, the Al content in the plating layer becomes relatively low, the Al phase is not formed on the surface layer of the plating layer, the oxide film becomes unstable, and the appearance during corrosion deteriorates significantly. This is because a large amount of the $MgZn_2$ phase is formed on the surface layer of the plating layer instead of relatively decreasing the Al phase. An Al—Si—O-based compound is no longer formed. Therefore, the Mg content is set to less than 15.0%. A preferable Mg content is 5.1% or more or 6.0% or more, and a preferable Mg content is 13.0% or less or 12.5% or less.

Si: 0.25% or More and Less than 3.50%

Si inhibits growth of the Al—Fe alloy layer and improves corrosion resistance. If Si is contained in a very small amount, it forms an Al—Ca—Si-based compound or the like, and also forms an interstitial solid solution in the Al—Fe alloy layer. The formation of an Al—Fe—Si intermetallic compound phase in the Al—Fe alloy layer has already been described above. If it can be incorporated into these compounds, it does not change in performance, regarding the performance of the plating layer. Therefore, if the Si content is less than 0.25%, most of Si is trapped in these compounds, and it is not possible to change the appearance of the plating layer and change sacrificial corrosion resistance and other performance such as corrosion resistance. Therefore, the Si content is set to 0.25% or more. In addition, if Si exceeds the lower limit concentration, an Al—Si—O-based compound is formed in the plating layer. The Al—Si—O-based compound forms a strong oxide film together with $Al_2O_3$ derived from Al in the plating layer and minimizes deterioration of the appearance of the plating layer. Thus, a preferable amount of Si is 0.25% or more, and a preferable amount of Si is 0.50% or more or 0.60% or more.

On the other hand, excessive Si forms an intermetallic compound such as coarse $Mg_2Si$ in the plating layer. Coarse $Mg_2Si$ is very easily eluted and increases sacrificial corrosion resistance, but if $Mg_2Si$ in a coarse state is dispersed in the plating layer, corrosion easily reaches the interface from the surface of the plating layer, it additionally promotes formation of a Zn—Al—$MgZn_2$ ternary eutectic structure and adversely affects the proportion of the basic constituent phases for maintaining corrosion resistance of the flat part, and thus the corrosion resistance of the flat part slightly deteriorates. In addition, when at least one of Ca, Y, La and Ce is contained, an intermetallic compound phase such as a $Ca_2Si$ phase is formed, the effect of containing Ca, Y or the like is reduced, and it is easy to remove the effect of an element such as Ca that is inherently added in a very small amount to generate the effect. In addition, if Si is contained excessively, it may be combined with other elements in the plating layer in various manners, and sufficient sacrificial corrosion resistance may not be obtained. Therefore, the Si content is set to less than 3.50%. In consideration of corrosion resistance and sacrificial corrosion resistance of the flat part, a preferable Si content may be 3.00% or less, 2.50% or less, 2.00% or less, 1.50% or less or 1.30% or less.

In addition, if the amount of Si is in a range of 0.25% or more and less than 3.50%, $Mg_2Si$ formed in the plating layer is finely dispersed and it is possible to increase sacrificial corrosion resistance and improve the blackening prevention effect of the plating layer without adversely affecting the change in appearance of the Al—Si—O-based compound. In order to prevent blackening, the amount of Si is preferably 0.40% or more and more preferably 0.80% or less.

$$2.0 \leq Mg/Si < 20.0 \qquad \text{Formula 1}$$

Mg and Si are very easily combined and form $Mg_2Si$, but the ratio of the contents of Mg and Si has a great effect on properties of the plating layer and thus it is necessary to set the ratio (Mg/Si) of the contents of Mg and Si to be within an appropriate range. Mg contained in the plating layer tends to form $Mg_2Si$, but if the Mg/Si is too large (the amount of Mg is too large with respect to the amount of Si), $Mg_2Si$, which contributes to improvement of sacrificial corrosion resistance, decreases and is unlikely to be formed, and there is a risk of sacrificial corrosion resistance of the plating layer decreasing in which the effect of the oxide film cannot be expected due to lack of Si and thus the appearance of the plating layer changes significantly. In addition, if the Mg/Si is too small, a large amount of an Al—Si—O-based compound is formed in the plating layer, the Al—Si—O-based compound in a granular form adheres to the surface of the plating layer, the appearance of the plating layer deteriorates, and additionally the corrosion resistance of the plating layer decreases. In addition, Si combines with various other additive elements in the plating layer and makes it difficult to maintain properties of the plating layer. Therefore, the Mg/Si is 2.0 or more, more preferably 6.0 or more, and still more preferably 8.0 or more. The Mg/Si is less than 20.0, more preferably 16.0 or less, and still more preferably 12.0 or less.

Element Group A (Sn: 0% or More and Less than 1.00%, Bi: 0% or More and Less than 1.00%, in: 0% or More and Less than 1.00%, and Total Amount (ΣA) of Element Group A: Less than 1.00%)

The element group A include elements (Sn, Bi, In) that can be optionally contained. When at least one element selected from the element group A is contained, the sacrificial corrosion resistance is improved. Each element of the element group A forms a compound together with Mg in the plating layer, this compound is easily eluted with water or the like, and Mg is easily eluted and thus sacrificial corrosion resistance can be imparted. If 0.01% or more of each element is contained, for example, the effect of improving sacrificial corrosion resistance can be confirmed at the cut end surface part with a sheet thickness of 1.6 mm. However, if the amount of these elements is excessive, the sacrificial corrosion resistance of the plating layer is improved, and as a result, the plating layer is more likely to be eluted, which adversely affects the corrosion resistance of the flat part or the like. In addition, the appearance of the plating layer is likely to be changed. Therefore, the amount of each element of the element group A is set to less than 1.00%. The total amount (ΣA) of the element group A is set to less than 1.00%. If ΣA is 1.00% or more, the appearance of the plating layer is likely to be changed.

In addition, when the element group A that improves sacrificial corrosion resistance is contained, it is possible to minimize a decrease in sacrificial corrosion resistance due to the formation of an Al—Si—O oxide. In the plating layer according to the present embodiment, Al forms an excellent insulating oxide film such as $Al_2O_3$ on the surface of the plating layer, and this $Al_2O_3$ oxide film has excellent barrier properties. Although Al is an element that exhibits a base potential, because its oxide film has a strong barrier property, it decreases the sacrificial corrosion resistance. When an Al—Si—O-based compound is added as a material constituting the oxide film, the barrier effect of the oxide film becomes excessively strong, and the sacrificial corrosion resistance decreases. Therefore, if the element group A is contained, it is possible to compensate for a decrease in sacrificial corrosion resistance due to the formation of the oxide film and to obtain a plating layer that is strong against the change in appearance while maintaining the sacrificial corrosion resistance.

Element Group B (Ca: 0% or More and Less than 0.60%, Y: 0% or More and Less than 0.60%, La: 0% or More and Less than 0.60%, Ce: 0% or More and Less than 0.60%, Sr: 0% or More and Less than 0.60%, and Total Amount (ΣB) of Element Group B: 0.02% or More and Less than 0.60%)

The elements (Ca, Y, La, Ce, Sr) of the element group B are optional additive elements, and when at least one element selected from the element group B and Mg are contained together, corrosion resistance and sacrificial corrosion resistance tend to be slightly improved. However, if the amount of these elements is excessive, an intermetallic compound phase composed of mainly each element is formed, the plating layer hardens, and there is a risk of cracks occurring during processing of the plating layer, and then powdering peeling. Therefore, the amount of each of these elements is preferably less than 0.60%. The amount of each element may be 0.01% or more or 0.02% or more.

In addition, if the total amount of the element group B is too large, a substance in a granular form adheres to the plating surface, and properties of the plating deteriorate and thus the total amount (ΣB) of these elements is set to less than 0.60%. In addition, if the total amount (ΣB) of these elements is reduced, the Al—Si—O-based compound is not formed in the plating layer. In addition, the elements of the element group B inherently have an effect of lowering the stability of $Mg_2Si$, which is likely to precipitate in lumps, and allowing $Mg_2Si$ to be finely dispersed and precipitated, a delicate component balance is required, and thereby it is possible to minimize blackening of the plating layer. Therefore, the total amount (ΣB) of the element group B is 0.02% or more. If the total amount ΣB is less than 0.02%, predetermined performance such as the appearance cannot be obtained. The total amount (ΣB) of the element group B may be 0.04% or more, and the total amount (ΣB) of the element group B may be 0.50% or less or 0.30% or less.

$$3.0 \leq Si/\Sigma B < 24.0 \quad \text{Formula 2}$$

When the ratio (Si/ΣB) between the Si content and the total amount (ΣB) of elements contained in the element group B is 24.0 or more (when the amount of Si is too large and the amount of the element group B is too small), Mg in the plating layer tends to form coarse $Mg_2Si$, and the bonding reaction between Mg—Si cannot be minimized as the Al—Si—O-based compound is sufficiently formed, and the effect of forming an Al—Si—O-based compound with the element group B cannot be obtained. Too coarse $Mg_2Si$ also cancels out the effect of the Al—Si—O oxide. Therefore, a diffraction peak according to the Al—Si—O-based compound does not appear, and the effect of minimizing the change in appearance of the plating layer cannot be obtained.

In addition, when Si/ΣB is less than 3.0 (when the amount of Si is too small and the amount of the element group B is too large), Ca, Al, and Si are combined to form an Al—Ca—Si compound, an Al—Si—O-based compound is not sufficiently generated, and when the surface of the plating layer is subjected to X-ray diffraction measurement, a diffraction peak according to the Al—Si—O-based compound does not appear, and the effect of minimizing the change in appearance of the plating layer cannot be obtained. As described above, Si is trapped in compounds and interfaces, and does not change the plating layer at all.

Therefore, Si/ΣB is 3.0 or more and less than 24.0. Si/ΣB is preferably 4.0 or more, and more preferably 5.0 or more. Si/ΣB is preferably 10.0 or less, and more preferably 8.0 or less.

$$26.0 \leq (Si/\Sigma B) \times (Mg/Si) < 375.0 \quad \text{Formula 3}$$

When both Formula 1 and Formula 2 are satisfied, conditions for forming an Al—Si—O-based compound are satisfied. However, in the vicinity of the upper limit value and the lower limit value of Formula 1 and Formula 2, depending on the component combination of constituent elements other than Mg, Si, and the element group B of the plating layer, the formation of $Mg_2Si$ and Al—Ca—Si compounds may be dominant over the formation of the Al—Si—O-based compound. Therefore, as a condition for reliably making the formation of the Al—Si—O-based compound to be dominant, (Si/ΣB)×(Mg/Si) is set to be within a range of 26.0 or more and less than 375.0. (Si/ΣB)×(Mg/Si) is the product of Si/ΣB in Formula 2 and Mg/Si in Formula 1, and in order to stably obtain an Al—Si—O-based compound, the lower limit of the product needs to be 26.0 or more. If the product is less than 26.0, the formation of the Al—Si—O-based compound becomes unstable, and predetermined performance such as maintaining the appearance of the plating layer and improving corrosion resistance may not be obtained. In addition, for the same reason, the upper limit needs to be less than 375.0. (Si/ΣB)×(Mg/Si) is more preferably 30.0 or more and still more preferably 35.0 or more. (Si/ΣB)×(Mg/Si) is more preferably 200.0 or less and still more preferably 100.0 or less.

Element Group C (Cr: 0% or More and Less than 0.25%, Ti: 0% or More and Less than 0.25%, Ni: 0% or More and Less than 0.25%, Co: 0% or More and Less than 0.25%, V: 0% or More and Less than 0.25%, Nb: 0% or More and Less than 0.25%, Zr: 0% or More and Less than 0.25%, Mo: 0% or More and Less than 0.25%, W: 0% or More and Less than 0.25%, Ag: 0% or More and Less than 0.25%, Cu: 0% or More and Less than 0.25%, Mn: 0% or More and Less than 0.25%, Fe: 0% or More and Less than 5.0%)

Among the elements in the element group C, elements other than Fe are metal elements that can be optionally contained in the plating layer. When these elements (Cr, Ti, Ni, Co, V, Nb, Zr, Mo, W, Ag, Cu, Mn) are contained, the effect of improving corrosion resistance of the flat part of the plating layer appears. Since the effect of distinctly improving corrosion resistance is confirmed with an amount of 0.10% or more, it is preferable to contain 0.10% or more of each of these elements. Since these elements do not affect the formation of an Al—Si—O-based compound as long as they are contained in a range of less than 0.25%, the amount of each of these elements is less than 0.25%, except for Fe.

When a plating layer is produced by a melt plating method, Fe may diffuse to some extent as a base iron element in the plating layer, and the range of the concentration of Fe incorporated by this production method is generally less than 5.0%, and since Fe does not affect the formation of an Al—Si—O-based compound within this concentration range, the amount of Fe is less than 5.0%.
Element Group D (Sb: 0% or More and 0.5% or Less, Pb: 0% or More and 0.5% or Less, B: 0% or More and 0.5% or Less, P: 0% or More and 0.5% or Less)

Elements (Sb, Pb, B, P) contained in the element group D are semimetal elements that can be added to the plating layer. When these elements are contained, the effect of improving corrosion resistance of the flat part of the plating layer appears. Since the effect of distinctly improving corrosion resistance is confirmed with a content of 0.1% or more, it is preferable to contain 0.1% or more of each of these elements. Since these elements do not affect the formation of an Al—Si—O-based compound as long as they are contained in a range of 0.5% or less, the amount of each of these elements is 0.5% or less.

Impurities

Impurities are components contained in raw materials or components that are mixed in during production processes, which are unintentionally incorporated components. For example, in the plating layer, a very small amount of components other than Fe is mixed in as impurities according to mutual atom diffusion between the steel material (base iron) and the plating bath. In addition, the impurities include oxygen. When the plating layer according to the present embodiment is pulled up from the plating bath in the production process, the plating layer in a molten state comes into contact with oxygen, and thus it contains a small amount of impurity-level oxygen. An Al—Si—O-based compound is formed with this impurity-level oxygen. The presence of oxygen in the plating layer can be confirmed by performing quantitative analysis on oxygen in the cross-sectional structure of the plating layer using EPMA or the like.

$$3.0 \leq Si/\Sigma A < 50.0$$

The element group A, like $Mg_2Si$, forms a compound that imparts a large effect on sacrificial corrosion resistance and is very easy to combine with Mg, and as a result, the effect of Si can be changed and thus the ratio ($Si/\Sigma A$) between the total amount ($\Sigma A$) of the element group A and the Si content is preferably within an appropriate range. When the addition amount is controlled, the effect of Si can be maximally exhibited, and a change to a plating layer with excellent performance can be performed. If $Si/\Sigma A$ is 3.0 or more and less than 50.0, it is possible to obtain a plating layer with excellent sacrificial corrosion resistance, for example, it is possible to generate a plating layer that is strong against the change in appearance while securing excellent sacrificial corrosion resistance in a cut end surface part, a plating processed part and the like. If $Si/\Sigma A$ is less than 3.0, the sacrificial corrosion-preventive effect is too strong, and the appearance is likely to be changed. In addition, if $Si/\Sigma A$ is 50.0 or more, the effect of improving sacrificial corrosion resistance cannot be expected. A range of $Si/\Sigma A$ is preferably 3.0 or more. A range of $Si/\Sigma A$ is more preferably 10.0 or less, and still more preferably 7.0 or less.

In order to identify the average chemical composition of the plating layer, an acid solution is obtained by peeling and dissolving the plating layer with an acid containing an inhibitor that minimizes corrosion of the base iron (steel material). Next, the chemical composition can be obtained by measuring the obtained acid solution by an ICP optical emission spectrometry method or an ICP-MS method. The type of acid is not particularly limited as long as it is an acid that can dissolve the plating layer. If the area and weight before and after peeling are measured, the amount of plating adhered ($g/m^2$) can be obtained at the same time.

Next, in the Zn—Al—Mg-based plating layer, compounds that form a dense oxide film on the surface of the plating layer will be described. The main constituent element of the oxide film formed on the surface of the plating layer is Al contained in the plating layer. A large amount of Al is mainly contained in a phase mainly composed of Al (hereinafter referred to as an Al phase) in the plating layer. Al contained in this Al phase forms $Al_2O_3$ in the oxide film. However, in the conventional Zn—Al—Mg-based plating layer, since the area fraction of the Al phase contained in the plating layer is about less than 70%, the amount of Al required to form a sufficient oxide film is insufficient and defects occur in the oxide film. Corrosion of the plating layer occurs from these defects, and the appearance of the plating layer is likely to be changed. On the other hand, in conventional Galvalume steel sheets (registered trademark) and the like, since the area fraction of the Al phase exceeds 70%, the appearance is less likely to change, but the sacrificial corrosion resistance is low.

In the present embodiment, in order to compensate for defects in the oxide film formed on the surface of the Zn—Al—Mg-based plating layer, an Al—Si—O-based compound is formed in the plating layer. It is known by XPS analysis that, when there is an Al—Si—O-based compound in the plating layer, the Al—Si—O-based compound forms a dense oxide film on the surface of the plating layer together with $Al_2O_3$ and $SiO_2$, and it is possible to compensate for defects in the conventional oxide film. Specifically, it is speculated that $Al_2O_5Si$ (JCPDS card No. 01-075-4827) is formed as the Al—Si—O-based compound.

It is difficult to investigate the relationship between the oxide film formed from these compounds and corrosion resistance using a TEM or the like, but the plating layer containing an Al—Si—O-based compound is a plating layer that does not easily change in appearance, and thus it can be clearly understood that the inclusion of the Al—Si—O-based compound improves the appearance change and corrosion resistance of the plating layer.

Detection of the Al—Si—O-based compound can be easily confirmed by using X-ray diffraction. That is, in the X-ray diffraction pattern, regarding diffraction angles shown in JCPDS card No. 01-075-4827, for example, when diffraction peaks at 16.18° ((110) plane) and 32.69° ((220)

plane) are detected, the Al—Si—O-based compound can be contained in the plating layer. Diffraction peaks other than this may overlap those of Al, MgZn$_2$ and the like in the Zn—Al—Mg-based plating layer, and are not suitable for identification.

For example, the X-ray diffraction pattern shown in FIG. 1 is the X-ray diffraction measurement result of the surfaces of the plating layers each containing 21% of Al, 7% of Mg, and 0%, 0.2%, 0.4% or 0.6% of Si, with the remainder being Zn and impurities. As shown in FIG. 1, it can be confirmed that the X-ray diffraction peaks at 16.18° and 32.69° increase as the Si content increases, and the presence of Al$_2$O$_5$Si (JCPDS card No. 01-075-4827) as an Al—Si—O-based compound can be determined. Here, regarding X-ray diffraction images, since diffraction images obtained vary depending on X-ray emission conditions, conditions in which X-ray diffraction images are obtained are as follows.

As an X-ray source, X-rays (CuKα rays) with a Cu target are most convenient because average information on constituent phases in the plating layer can be obtained. As other measurement conditions, X-ray output conditions are set to a voltage of 40 kV and a current of 150 mA. The X-ray diffraction device is not particularly limited, and for example, a sample horizontal high-precision X-ray diffraction device RINT-TTR III (commercially available from Rigaku Corporation) can be used.

As measurement conditions other than the X-ray source, it is preferable that goniometer TTR (horizontal goniometer) be used, the slit width of the KO filter be 0.05 mm, the longitudinal limiting slit be 2 mm, the light receiving slit be 8 mm, the light receiving slit 2 be open, the scan speed be 5 deg./min, the step width be 0.01 deg, and the scan axis 2θ be 5 to 90°.

For measurement, X-rays are emitted to the surface of the plating layer. The plating layer is directly measured without sample adjustment. Since the diffraction intensity differs depending on the model, it is better to determine the presence of the relative intensity at a specific angle. Specifically, as exemplified in FIG. 1, in the plating layer according to the present embodiment, since no diffraction peak is observed in the vicinity of a diffraction angle of 27.0°, a ratio of the sum of the diffraction peak intensity at 16.18° and the diffraction peak intensity (cps) at 32.69° to the diffraction intensity (cps) at 27.0° is used as an evaluation parameter. That is, in the present embodiment, the diffraction intensity ratio R1 defined by Formula 4 needs to satisfy Formula 5.

Here, when a diffraction peak with an intensity of 1,000 cps or more appears at 2θ=27.0°, I(27.0°) in Formula 4 is 585 cps. That is, Formula 4-1 is used. When a diffraction peak with an intensity of 1,000 cps or more appears at 2θ=27.0°, since some compounds are exceptionally contained in the plating layer, an appropriate diffraction intensity cannot be obtained. The value of 585 eps used alternatively is an average value of measurement data (actual value) of diffraction intensities of the plating layer according to the present embodiment, and corresponds to the background intensity. As described above, at 2θ=27.0° and in the vicinity thereof, since a diffraction peak according to the crystal phase contained in the plating layer cannot be obtained, the diffraction intensity at 2θ=27.0° can be used as the average value of the blank, and can be used as the background intensity in the diffraction intensity.

$$R1=\{I(16.18°)+I(32.69°)\}/I(27.0°) \quad \text{Formula 4}$$

$$2.5<R1 \quad \text{Formula 5}$$

$$R1=\{I(16.18°)+I(32.69°)\}/585 \quad \text{Formula 4-1}$$

However, in Formula 4 and Formula 4-1, I(16.18°) is a diffraction intensity at 2θ=16.18° in the X-ray diffraction pattern, and I(32.69°) is a diffraction intensity at 2θ=32.69° in the X-ray diffraction pattern. In addition, I(27.0°) is a diffraction intensity at 2θ=27.0° in the X-ray diffraction pattern.

When Formula 5 is satisfied, it is possible to confirm that an Al—Si—O-based compound represented by Al$_2$O$_5$Si is present in the plating layer. As the amount of the Al—Si—O-based compound increases, the oxide film becomes denser and stronger, the appearance is less likely to change, and the corrosion resistance is further improved. These effects become stronger as the amount of the Al—Si—O-based compound is larger and the appearance over a long time is less likely to change. Therefore, more preferably, as shown in Formula 8, the diffraction intensity ratio R1 is more preferably more than 10. If the diffraction intensity R1 is more than 10, the Al—Si—O-based compound is sufficiently contained in the plating layer, and it is possible to significantly minimize a change in appearance of the plating layer over a long time.

$$10<R1 \quad \text{Formula 8}$$

Here, the upper limit of the diffraction intensity ratio R1 does not need to be determined particularly, but R1 may be 20 or less, 15 or less or 12 or less.

In addition, the plating layer according to the present embodiment may contain Mg$_2$Si. The presence of Mg$_2$Si can be confirmed by an X-ray diffraction method. Specifically, in JCPDS card No. 00-035-0773, as diffraction intensities of Mg$_2$Si, diffraction peaks at diffraction angles of 24.24° ((111) plane) and 28.07° ((200) plane) are known, and when the surface of the plating layer is subjected to X-ray diffraction measurement, the presence of Mg$_2$Si can be determined by detecting these diffraction peaks on the X-ray diffraction pattern. In the case of the present embodiment, it is preferable that the diffraction intensity R2 represented by Formula 6 satisfy Formula 7. In the plating layer according to the present embodiment, since no diffraction peak is observed in the vicinity of a diffraction angle of 27.0°, a ratio of the sum of diffraction peak intensity at 24.24° and the diffraction peak intensity (cps) at 28.07° to the diffraction intensity (cps) at 27.0° is used as an evaluation parameter.

Here, when a diffraction peak with an intensity of 1,000 cps or more appears at 2θ=27.0°, I(27.0°) in Formula 6 is 585 cps. That is, Formula 6-1 is used.

$$R2=\{I(24.24°)+I(28.07°)\}/I(27.0°) \quad \text{Formula 6}$$

$$2.5<R2 \quad \text{Formula 7}$$

$$R2=\{I(24.24°)+I(28.07°)\}/585 \quad \text{Formula 6-1}$$

In Formula 6 and Formula 6-1, I(24.24°) is a diffraction intensity at 2θ=24.24° in the X-ray diffraction pattern, and I(28.07°) is a diffraction intensity at 2θ=28.07° in the X-ray diffraction pattern. In addition, I(27.0°) is a diffraction intensity at 2θ=27.0° in the X-ray diffraction pattern. In addition, the conditions for X-ray diffraction measurement when the diffraction intensity ratio R2 is obtained are the same as those for obtaining the diffraction intensity ratio R1.

When the diffraction intensity ratio R2 is more than 2.5, Mg$_2$Si is sufficiently contained in the plating layer, and it is possible to minimize blackening of the plating layer. However, when the amount of Mg$_2$Si increases and the diffraction intensity ratio R2 increases, the amount of the Al—Si—O-based compound decreases, which may affect the appearance change of the plating layer, and the Zn—Al—MgZn$_2$ ternary eutectic structure in the plating layer may decrease, and the corrosion resistance of the plating layer may decrease. Therefore, the diffraction intensity ratio R2 may be 20 or less, 15 or less, or 12 or less.

Next, a method of producing a plated steel material of the present embodiment will be described.

The plated steel material of the present embodiment includes a steel material and a plating layer formed on the surface of the steel material. Generally, the Zn—Al—Mg-based plating is formed by metal deposition and a coagulation reaction. The easiest method of forming a plating layer is to form a plating layer on the surface of the steel sheet by a melt plating method, and the plating layer can be formed by a Sendzimir method, a flux method or the like. In addition, for the plated steel material of the present embodiment, an evaporation plating method or a method of forming a plating coating by thermal spraying may be applied, and the same effects as in the case of forming by a melt plating method can be obtained.

Hereinafter, a case in which the plated steel material of the present embodiment is produced by a melt plating method will be described. The plated steel material of the present embodiment can be produced by either an immersion type plating method (batch type) or a continuous type plating method.

The size, shape, surface form and the like of the steel material to be plated are not particularly limited. General steel materials, stainless steel and the like can be applied as long as they are steel materials. Steel strips of general structure steel are most preferable. In advance, the surface may be finished by shot blasting or the like, and there is no problem even if plating is performed after a metal film or alloy film of 3 g/m$^2$ or less such as Ni, Fe, or Zn plating is adhered to the surface. In addition, as a pretreatment for the steel material, it is preferable to sufficiently wash the steel material by degreasing and pickling.

After the surface of the steel sheet is sufficiently heated and reduced with a reducing gas such as H$_2$, the steel material is immersed in a plating bath containing predetermined components.

In the case of the melt plating method, components of the plating layer can be controlled by components of a plating bath to be prepared. A plating bath is prepared by mixing predetermined amounts of pure metals, and for example, an alloy of plating bath components is produced by a dissolution method in an inert atmosphere. Since the component composition of the plating bath and the component composition of the plating layer are almost the same, the component composition of the plating bath may match the component composition of the plating layer described above.

When the steel material whose surface is reduced is immersed in a plating bath maintained at a predetermined concentration, a plating layer with almost the same components as the plating bath is formed. When the immersion time is prolonged and it takes a long time to complete coagulation, since the formation of the interface alloy layer becomes active, the Fe concentration may increase. However, if the bath temperature of the plating bath is less than 500° C., since the reaction with the plating layer rapidly slows down, the concentration of Fe contained in the plating layer generally falls below 5.0%.

In order to form a melt plating layer, it is preferable to immerse the reduced steel material in a plating bath at 500° C. to 650° C. for several seconds. On the surface of the reduced steel material, Fe diffuses into the plating bath and reacts with the plating bath to form an interface alloy layer (mainly an Al—Fe-based intermetallic compound layer) at the steel sheet interface between the plating layer and the steel sheet. According to the interface alloy layer, the steel material below the interface alloy layer and the plating layer above the interface alloy layer are metal-chemically bonded.

After the steel material is immersed in the plating bath for a predetermined time, the steel material is pulled out of the plating bath, and when the metal adhered to the surface is melted, N$_2$ wiping is performed and thus the plating layer is adjusted to have a predetermined thickness. It is preferable to adjust the thickness of the plating layer to 3 to 80 km. The converted amount of the plating layer adhered is 10 to 500 g/m$^2$ (one side). In addition, the thickness of the plating layer may be adjusted to 5 to 70 μm. The converted adhesion amount is 20 to 400 g/m$^2$ (one side).

After the adhesion amount of the plating layer is adjusted, the adhered molten metal is coagulated. A cooling method during plating coagulation may be performed by spraying nitrogen, air or a hydrogen/helium mixed gas, mist cooling or immersion in water. Preferably, mist cooling is preferable, and mist cooling in which water is contained in nitrogen is preferable. The cooling rate may be adjusted according to the water content.

Here, regarding the formation of Al—Si—O, it is necessary to strictly control the oxygen concentration and the temperature range after immersion in the plating bath. In the case of the plating composition according to the present embodiment, it very easily combines with oxygen, even if the oxygen concentration and the cooling rate are not controlled within an appropriate temperature range, a cloudy oxide layer is formed on the surface of the plating layer, the appearance is poor, the formation of Al—Si—O becomes unstable, and a desired plating layer is not obtained. Therefore, in the present embodiment, it is desirable to use the following production conditions.

For the atmosphere in contact with the surface of the plating bath, the oxygen concentration should not be low, and the plating bath is preferably left in the atmosphere. Therefore, from when the steel material is immersed in the plating bath until immediately after the steel material is pulled up from the plating bath, the steel material is passed through the atmosphere. That is, it is necessary to bring the steel material immediately after being pulled up from the plating bath into contact with atmospheric atmosphere.

Cooling of the molten metal starts from when the steel material is pulled up from the plating bath. However, in the present embodiment, after the steel material is pulled up from the plating bath, when the temperature of the molten metal adhered to the surface of the steel material is in a range of 490 to 400° C., it is necessary to put the steel material into the atmosphere with a low oxygen concentration. Specifically, the oxygen concentration in the atmosphere between 490 and 400° C. is less than 3,000 ppm. The oxygen concentration in the atmosphere between 490 and 400° C. is preferably less than 2,000 ppm, and more preferably less than 1,000 ppm. Here, since it is necessary to bring the molten metal on the surface of the steel material into contact with the atmosphere immediately after pulling it up from the plating bath, the plating bath temperature needs to be kept higher than 490° C. and preferably 500° C. or higher. The oxygen concentration in the atmosphere between the plating bath temperature and 490° C. is preferably 3,000 ppm or more.

In addition, the average cooling rate between the bath temperature and 400° C. is less than 15° C./sec. If the average cooling rate is 15° C./sec or more, an Al—Ca—Si compound and Mg$_2$Si are easily formed, and the formation of Al—Si—O becomes unstable. An average cooling rate up to 400° C. should always be less than 15° C./sec.

When the temperature of the plating layer is between 400 and 300° C., cooling is performed in the atmosphere. In addition, rapid cooling is required for cooling at a temperature of the plating layer in a range of 400° C. or lower and the average cooling rate between 400 and 300° C. is 15° C./sec or more. This is because, if the average cooling rate is less than 15° C./sec, the Al—Si—O-based compound formed on the surface layer of the plating layer is precipitated inside the plating layer in a molten state, and it is difficult to form an oxide film on the surface of the plating layer.

In the method of producing a plated steel material according to the present embodiment, the oxygen concentration and the average cooling rate are controlled as described above immediately after the steel material is pulled up from the plating bath to 400° C., and when the temperature of the plating layer is between 400 and 300° C., cooling is performed in the atmosphere, and thus a plating layer containing an Al—Si—O-based compound is formed on the surface of the steel material. Conditions in a temperature range of less than 300° C. are not particularly limited. As described above, the plating layer according to the present embodiment is formed.

When the steel material is exposed to the atmosphere immediately after it is pulled up from the plating bath, oxygen in the atmosphere diffuses into the molten metal with a newly formed surface, and the most easily oxidized metal, that is, an Al—Si—O oxide film, and its compounds are formed to some extent. After that, when an atmosphere with a low oxygen concentration is generated, excess oxidation of the molten metal is minimized, and at the same time, the plating layer is coagulated, and an oxide film derived from the Al—Si—O-based compound is thought to be formed near the surface of the plating layer. It is assumed that the production temperature range and their respective element concentrations determine the formation behavior of this compound due to ease of movement of elements because it relates to individual element diffusion phenomena in oxygen and the molten metal. In addition, it is thought that, since the composition of the plating layer and the production temperature range are limited to a predetermined range, precipitation of excessive $Mg_2Si$ is minimized.

After the plating layer is formed, various chemical conversion treatments and coating treatments may be performed on the plating layer. It is possible to use an uneven pattern on the surface of the plating layer, to also add a plating layer of Cr, Ni, Au or the like, and to additionally perform coating to impart a design. In addition, in order to further improve corrosion resistance, touch-up paint for repair, a spraying treatment and the like may be applied to the welded part, the processed part and the like.

In the plated steel material of the present embodiment, a coating may be formed on the plating layer. One, two, or more coating layers can be formed. Examples of types of the coating directly above the plating layer include a chromate coating, a phosphate coating, and a chromate-free coating. A chromate treatment, a phosphate treatment, and a chromate-free treatment for forming these coatings can be performed by known methods.

The chromate treatment includes an electrolytic chromate treatment in which a chromate coating is formed by electrolysis, a reactive chromate treatment in which a coating is formed using a reaction with a material and an excess treatment liquid is then washed away, and a coating type chromate treatment in which a treatment liquid is applied to an object to be coated and dried without washing with water to form a coating. Any treatment may be used.

Examples of electrolytic chromate treatments include electrolytic chromate treatments using chromic acid, silica sol, a resin (phosphoric acid, an acrylic resin, a vinyl ester resin, a vinyl acetate acrylic emulsion, a carboxylated styrene butadiene latex, a diisopropanolamine modified epoxy resin, etc.), and hard silica.

Examples of phosphate treatments include a zinc phosphate treatment, a zinc calcium phosphate treatment, and a manganese phosphate treatment.

The chromate-free treatment is particularly suitable because it has no burden on the environment. The chromate-free treatment includes an electrolytic chromate-free treatment in which a chromate-free coating is formed by electrolysis, a reactive chromate-free treatment in which a coating is formed using a reaction with a material and an excess treatment liquid is then washed away, and a coating type chromate-free treatment in which a treatment liquid is applied to an object to be coated and dried without washing with water to form a coating. Any treatment may be used.

In addition, on the coating directly above the plating layer, one, two or more organic resin coating layers may be provided. The organic resin is not limited to a specific type, and examples thereof include polyester resins, polyurethane resins, epoxy resins, acrylic resins, polyolefin resins, and modified components of these resins. Here, the modified component is a resin obtained by reacting a reactive functional group contained in the structure of these resins with another compound (a monomer, cross-linking agents, etc.) containing a functional group that can react with the functional group in the structure.

As such an organic resin, a mixture of one, two or more organic resins (unmodified) may be used or a mixture of one, two or more organic resins obtained by modifying at least one other organic resin in the presence of at least one organic resin may be used. In addition, the organic resin coating may contain any coloring pigment or anticorrosive pigment. A water-based component obtained by dissolving or dispersing in water can also be used.

For the basic corrosion resistance of the plated steel sheet, the corrosion resistance of a bare flat part may be evaluated by an exposure test, a salt spray test (JIS Z2371) or a combined cyclic corrosion test (CCT) including a salt spray test.

In addition, in order to confirm sacrificial corrosion resistance, any of these tests is performed using the plated steel sheet with the cut end surface that is open, and the superiority or inferiority of the sacrificial corrosion resistance can be evaluated by evaluating the red rust area fraction of the end surface part (the smaller the area, the better the corrosion resistance).

It is preferable to evaluate the change in plating appearance according to the change in color difference after the corrosion test. For example, because the initial appearance change is assumed to be caused by corrosion or the like due to humidity, the color difference before and after being left in a constant temperature and humidity chamber is observed. Using a color-difference meter, color determination is performed based on the amount of change in the L*a*b*color space and the absolute value of $\Delta E$. If $\Delta E$ is small, it means that the color change is small before and after corrosion, and on the other hand, if $\Delta E$ is large, it means that the color change is large before and after corrosion. When corrosion is examined for a long time, a color difference before and after the salt spray test and combined cyclic corrosion test may be determined.

ΔE is represented by the following formula, where a* and b are chromaticness indices in the L*a*b* color system and L* is the brightness index.

$$\Delta E^*ab = \sqrt{((\Delta a^*)^2 + (\Delta b^*)^2 + (\Delta L^*)^2)}$$

EXAMPLES

Plated steel materials (plated steel sheets) shown in Table 2A to Table 6B were produced and performance was evaluated.

Various plating baths were prepared by mixing pure metals. For plating alloy components, Fe powder was added after a bath was built so that the Fe concentration do not increase during the test. Regarding the components of the plated steel sheets, the plating layer was peeled off with hydrochloric acid in which an inhibitor was dissolved, and peeled components were subjected to component analysis through ICP. In the tables, "0" indicates that the amount of the element was below the detection limit.

A hot-rolled base sheet (1.6 to 3.2 mm) with a 180×100 size was subjected to a plated steel sheet test using a batch type melt plating simulator (commercially available from Rhesca Co., Ltd.). A K thermocouple was attached to a part of the plating base sheet, in a N$_2$ (H$_2$-5% reduction) atmosphere, annealing was performed at an annealing temperature of 800° C. for 1 minute, and the surface of the plating base sheet was then sufficiently reduced with hydrogen, and the sample was immersed in the plating bath under respective conditions for 3 seconds. Then, the plated steel sheet was pulled up, and the plating thickness was adjusted to 25 to 30 μm by N$_2$ gas wiping. In addition, after the plated steel sheet was pulled up from the plating bath, plated steel sheets were produced under various cooling conditions A to K in Table 1.

TABLE 1

| Condition | Bath temperature to 490° C. | 490° C. to 400° C. | 400° C. to 300° C. | Lower than 300° C. |
| --- | --- | --- | --- | --- |
| A | less than 15 °C./sec less than 15° C./sec air | 15° C./sec 15° C./sec or more less than 3000 ppm | 15° C./sec or more air | less than 15° C./sec air |
| B | less than 15° C./sec less than 15° C./sec air | 15° C./sec less than 15° C./sec less than 3000 ppm | 15° C./sec or more air | less than 15° C./sec air |
| C | less than 15° C./sec less than 15° C./sec air | 15° C./sec 15° C./sec less than 1000 ppm | 15° C./sec or more air | less than 15° C./sec air |
| D | less than 15° C./sec less than 15° C./sec less than 1000 ppm | 15° C./sec less than 15° C./sec less than 3000 ppm | 15° C./sec or more air | less than 15° C./sec air |
| E | less than 15° C./sec less than 15° C./sec air | 15° C./sec less than 15° C./sec less than 3000 ppm | 15° C./sec or more less than 3000 ppm | less than 15° C./sec air |
| F | less than 15° C./sec less than 15° C./sec less than 3000 ppm | 15° C./sec less than 15° C./sec less than 3000 ppm | 15° C./sec or more less than 3000 ppm | less than 15° C./sec 3000 ppm |

TABLE 1-continued

| Condition | Bath temperature to 490° C. | 490° C. to 400° C. | 400° C. to 300° C. | Lower than 300° C. |
| --- | --- | --- | --- | --- |
| G | 15° C./sec or more 15° C./sec or more air | 15° C./sec or more less than 3000 ppm | 15° C./sec or more air | 15° C./sec or more air |
| H | less than 15° C./sec less than 15° C./sec air | 15° C./sec less than 15° C./sec less than 3000 ppm | less than 15° C./sec air | less than 15° C./sec air |
| I | less than 15° C./sec less than 15° C./sec air | 15° C./sec less than 15° C./sec less than 3000 ppm | 15° C./sec or more air | 15° C./sec or more air |
| J | less than 15° C./sec 15 °C./sec or more air | 15° C./sec less than 15° C./sec less than 3000 ppm | 15° C./sec or more air | less than 15° C./sec air |
| K | less than 15° C./sec less than 15° C./sec air | 15° C./sec less than 15° C./sec air | 15° C./sec or more air | less than 15° C./sec air |

The upper part and the middle part are average cooling rates, the lower part is atmosphere, and ppm concentration in the lower part is an oxygen concentration.

The underlined part indicates that it is outside a preferable production condition.

Condition D is a comparative condition with a low oxygen concentration between the bath temperature and 490° C.

Condition E is a comparative condition with a low oxygen concentration between 400 and 300° C.

Condition F is a comparative condition with a low oxygen concentration between the bath temperature and 490° C. and with a low oxygen concentration between 400 and 300° C.

Condition G is a comparative condition with a high average cooling rate between the bath temperature and 400° C.

Condition H is a comparative condition with a low average cooling rate between 400 and 300° C.

Condition K is a comparative condition with a high oxygen concentration between 490 and 400° C.

Conditions other than these are preferable conditions.

The plated steel sheet after plating was cut into 20 mm squares, and using a high-angle X-ray diffractometer (model number RINT-TTR III commercially available from Rigaku Corporation), under conditions of an X-ray output of 40 kV, 150 mA, a copper target, a goniometer TTR (horizontal goniometer), a Kβ filter slit width of 0.05 mm, a longitudinal limit slit width of 2 mm, a light receiving slit width of 8 mm, and a light receiving slit 2 that was open, measurement was performed in measurement conditions of a scan speed of 5 deg./min, a step width of 0.01 deg., and a scan axis of 2θ (5 to 90°), and the intensity (cps) of the diffraction peak at each angle was obtained. Then, R1 and R2 were obtained from the diffraction intensity. Here, in the column of the BG adopted value in Table 6A and Table 6B, "27°" means that the denominator in Formula 4 and Formula 6 is I(27.0°) (diffraction intensity (cps) at 2θ=27.0°). In addition, "585" means that the denominator in Formula 4 and Formula 6 is 585 cps.

Regarding the corrosion resistance of the flat part of the plated steel sheet, a quadrangle test piece with a 70×150 mm size was cut out from the produced plated steel sheet, the end surface of the test piece was protected with an epoxy resin paint, a 5% salt spray test (JIS 2371) was performed for 120 hours, and the white rust area fraction of the evaluation surface was evaluated. The evaluation criteria for the white rust area fraction are shown below. "A" or higher was satisfactory.

A white rust area fraction of less than 5% was evaluated as "AAA."

A white rust area fraction of 5 to 10% was evaluated as "AA."

A white rust area fraction of 10 to 20% was evaluated as "A."

A white rust area fraction of 20% or more was evaluated as "B."

At the initial stage of the corrosion procedure, the more the plating layer resisted corrosion, the less white rust was generated.

Regarding the sacrificial corrosion resistance, a 70×150 mm quadrangle test piece was cut out from the plated steel sheet, the JASO test (M609-91) was performed when four end surfaces of the test piece were open, and the red rust area fractions of the left and right side parts in the end surface part after 30 cycles were evaluated. The evaluation criteria for the red rust area fraction are shown below. "A" or higher was satisfactory.

A red rust area fraction of less than 5% was evaluated as "AAA."

A red rust area fraction of 5 to 10% was evaluated as "AA."

A red rust area fraction of 10 to 20% was evaluated as "A."

A red rust area fraction of 20% or more was evaluated as "B."

When white rust was formed to cover the end surface part due to corrosion of the plated steel sheet, the occurrence of red rust was minimized and the red rust area fraction tended to decrease.

For corrosion appearance evaluation (short term), a quadrangle test piece with a size of 70×150 mm was cut out from the produced plated steel sheet, the end surface was protected with an epoxy resin paint, the plated steel sheet was left in a constant temperature and humidity chamber at a humidity of 90% and a temperature of 70 degree Celsius for 24, 48, 72, 120 hours, and the color difference before and after the test was measured. The appearance change of the steel sheet was evaluated based on the magnitude of the amount of change in ΔE (SCE method). The evaluation criteria are as follows. "A" or higher was satisfactory.

ΔE is represented by the following formula, where a* and b* are chromaticness indices in the L*a*b* color system and L* is the brightness index. "A" or higher was satisfactory.

$$\Delta E^*ab = \sqrt{((\Delta a)^2 + (\Delta b^*)^2 + (\Delta L^*)^2)}$$

A case in which ΔE<5 continued for 120 hours or longer was evaluated as "S."

A case in which ΔE<5 continued for 72 hours or longer was evaluated as "AAA."

A case in which ΔE<5 continued for 48 hours or longer was evaluated as "AA."

A case in which ΔE<5 continued for 24 hours or longer was evaluated as "A."

A case in which ΔE<5 did not continue within 24 hours was evaluated as "B."

For corrosion appearance evaluation (long time), a quadrangle test piece with a size of 70×150 mm was cut out from the produced plated steel sheet, the end surface was protected with an epoxy resin paint, the plated steel sheet was subjected to the JASO test for 3, 6, 9, and 15 cycles, and the color difference ΔE before and after the test was measured in a part in which white rust did not occur. The appearance change of the steel sheet was evaluated based on the magnitude of the amount of change in ΔE (SCE method). The evaluation criteria are as follows. "A" or higher was satisfactory.

A case in which ΔE<5 continued for 15 cycles or more was evaluated as "S."

A case in which ΔE<5 continued for 9 cycles or more was evaluated as "AAA."

A case in which ΔE<5 continued for 6 cycles or more was evaluated as "AA."

A case in which ΔE<5 continued for 3 cycles or more was evaluated as "A."

A case in which ΔE<5 did not continue within 3 cycles was evaluated as "B."

As shown in Table 2A to Table 6B, Examples 1 to 5, 11, 12, 14 to 16, 21, 22, 26 to 46, 48 to 51 satisfied the scope of the present invention, and had favorable properties of all of corrosion resistance, sacrificial corrosion resistance, corrosion appearance evaluation (short term) and corrosion appearance evaluation (long time).

In Comparative Examples 6 to 10, 13, 17 to 21 and 24, since production conditions were not preferable, the diffraction intensity ratio R1 was 2.5 or less, and properties of corrosion resistance, sacrificial corrosion resistance, corrosion appearance evaluation (short term) and corrosion appearance evaluation (long time) were all unsatisfactory.

In Comparative Example 25, (Si/ΣB)×(Mg/Si) was 375.0 or more and thus the diffraction intensity ratio R1 was 2.5 or less, and properties of corrosion resistance, sacrificial corrosion resistance, corrosion appearance evaluation (short term) and corrosion appearance evaluation (long time) were all unsatisfactory.

In Comparative Example 47, (Si/ΣB)×(Mg/Si) was less than 26.0 and thus the diffraction intensity ratio R1 was 2.5 or less, and properties of corrosion resistance, sacrificial corrosion resistance, corrosion appearance evaluation (short term) and corrosion appearance evaluation (long time) were all unsatisfactory.

In Comparative Examples 52 to 78, the average chemical composition of the plating layer was outside the scope of the present invention and thus the diffraction intensity ratio R1 was 2.5 or less, and properties of corrosion resistance, sacrificial corrosion resistance, corrosion appearance evaluation (short term) and corrosion appearance evaluation (long time) were all unsatisfactory.

TABLE 2A

| | | Bath temperature (°C.) | Production method | Plating layer | | | | | | |
|---|---|---|---|---|---|---|---|---|---|---|
| | | | | | | | Element group A | | | |
| No. | Category | | | Zn | Al | Mg | Sn | Bi | In | ΣA |
| 1 | Example | 550 | B | 73.29 | 19.0 | 6.0 | 0.01 | 0 | 0 | 0.01 |
| 2 | Example | 550 | B | 65.42 | 20.0 | 12.5 | 0.03 | 0 | 0 | 0.03 |
| 3 | Example | 600 | C | 54.27 | 27.0 | 14.9 | 0.05 | 0 | 0 | 0.05 |
| 4 | Example | 550 | B | 76.35 | 17.0 | 5.1 | 0.08 | 0 | 0 | 0.08 |
| 5 | Example | 550 | A | 76.35 | 17.0 | 5.1 | 0.08 | 0 | 0 | 0.08 |

TABLE 2A-continued

| No. | Category | Bath temperature (° C.) | Production method | Plating layer Zn | Al | Mg | Element group A Sn | Bi | In | ΣA |
|---|---|---|---|---|---|---|---|---|---|---|
| 6 | Comparative Example | 550 | <u>D</u> | 76.35 | 17.0 | 5.1 | 0.08 | 0 | 0 | 0.08 |
| 7 | Comparative Example | 550 | <u>E</u> | 76.35 | 17.0 | 5.1 | 0.08 | 0 | 0 | 0.08 |
| 8 | Comparative Example | 550 | <u>F</u> | 76.35 | 17.0 | 5.1 | 0.08 | 0 | 0 | 0.08 |
| 9 | Comparative Example | 550 | <u>G</u> | 76.35 | 17.0 | 5.1 | 0.08 | 0 | 0 | 0.08 |
| 10 | Comparative Example | 550 | <u>H</u> | 76.35 | 17.0 | 5.1 | 0.08 | 0 | 0 | 0.08 |
| 11 | Example | 550 | I | 76.35 | 17.0 | 5.1 | 0.08 | 0 | 0 | 0.08 |
| 12 | Example | 550 | J | 76.35 | 17.0 | 5.1 | 0.08 | 0 | 0 | 0.08 |
| 13 | Comparative Example | 550 | <u>K</u> | 76.35 | 17.0 | 5.1 | 0.08 | 0 | 0 | 0.08 |
| 14 | Example | 550 | B | 67.12 | 18.0 | 12.5 | 0.02 | 0 | 0.09 | 0.11 |
| 15 | Example | 550 | C | 67.69 | 18.0 | 12.5 | 0.05 | 0.09 | 0 | 0.14 |
| 16 | Example | 550 | A | 67.69 | 18.0 | 12.5 | 0.05 | 0.09 | 0 | 0.14 |
| 17 | Comparative Example | 550 | <u>D</u> | 67.69 | 18.0 | 12.5 | 0.05 | 0.09 | 0 | 0.14 |
| 18 | Comparative Example | 550 | <u>E</u> | 67.69 | 18.0 | 12.5 | 0.05 | 0.09 | 0 | 0.14 |
| 19 | Comparative Example | 550 | <u>F</u> | 67.69 | 18.0 | 12.5 | 0.05 | 0.09 | 0 | 0.14 |
| 20 | Comparative Example | 550 | <u>G</u> | 67.69 | 18.0 | 12.5 | 0.05 | 0.09 | 0 | 0.14 |
| 21 | Comparative Example | 550 | <u>H</u> | 67.69 | 18.0 | 12.5 | 0.05 | 0.09 | 0 | 0.14 |
| 22 | Example | 550 | I | 67.69 | 18.0 | 12.5 | 0.05 | 0.09 | 0 | 0.14 |
| 23 | Example | 550 | J | 67.69 | 18.0 | 12.5 | 0.05 | 0.09 | 0 | 0.14 |
| 24 | Comparative Example | 550 | <u>K</u> | 67.69 | 18.0 | 12.5 | 0.05 | 0.09 | 0 | 0.14 |
| 25 | Comparative Example | 550 | <u>B</u> | 67.86 | 18.0 | 12.5 | 0.08 | 0 | 0 | 0.08 |
| 26 | Example | 600 | B | 56.89 | 25.0 | 14.8 | 0.20 | 0 | 0.10 | 0.30 |
| 27 | Example | 550 | B | 66.74 | 21.0 | 10.0 | 0.20 | 0 | 0.20 | 0.40 |
| 28 | Example | 550 | B | 69.34 | 21.0 | 7.0 | 0.10 | 0.30 | 0 | 0.40 |
| 29 | Example | 550 | B | 70.86 | 22.0 | 5.1 | 0.07 | 0 | 0.01 | 0.08 |
| 30 | Example | 550 | B | 70.85 | 22.0 | 5.1 | 0.08 | 0 | 0.01 | 0.09 |
| 31 | Example | 550 | B | 72.98 | 19.0 | 5.6 | 0.10 | 0.01 | 0 | 0.11 |
| 32 | Example | 550 | B | 73.08 | 19.0 | 5.5 | 0.10 | 0.01 | 0 | 0.11 |
| 33 | Example | 550 | B | 72.98 | 19.0 | 5.6 | 0.10 | 0.01 | 0 | 0.11 |
| 34 | Example | 550 | B | 72.98 | 19.0 | 5.6 | 0.10 | 0.01 | 0 | 0.11 |

The amount of elements in the table is an average chemical composition, and the unit is mass %.
The remainder in the average chemical composition of the plating layer in the table is impurities.
The underlined part indicates that it is outside the scope of the present invention.

TABLE 2B

| No. | Category | Bath temperature (° C.) | Production method | Plating layer Zn | Al | Mg | Element group A Sn | Bi | In | ΣA |
|---|---|---|---|---|---|---|---|---|---|---|
| 35 | Example | 550 | B | 72.98 | 19.0 | 5.6 | 0.10 | 0.01 | 0 | 0.11 |
| 36 | Example | 550 | C | 72.80 | 19.0 | 6.5 | 0.10 | 0 | 0 | 0.10 |
| 37 | Example | 550 | B | 71.97 | 19.0 | 7.1 | 0.10 | 0 | 0 | 0.10 |
| 38 | Example | 550 | B | 70.87 | 19.0 | 6.2 | 0.10 | 0 | 0 | 0.10 |
| 39 | Example | 600 | B | 60.74 | 28.0 | 6.8 | 0.10 | 0 | 0.40 | 0.50 |
| 40 | Example | 600 | C | 55.25 | 29.0 | 12.0 | 0.10 | 0 | 0 | 0.10 |
| 41 | Example | 600 | B | 62.00 | 25.0 | 10.0 | 0 | 0 | 0 | 0 |
| 42 | Example | 600 | B | 62.00 | 25.0 | 10.0 | 0 | 0 | 0 | 0 |
| 43 | Example | 600 | B | 53.92 | 29.5 | 12.5 | 0.10 | 0.50 | 0 | 0.60 |
| 44 | Example | 550 | B | 70.97 | 19.0 | 7.5 | 0.10 | 0 | 0 | 0.10 |
| 45 | Example | 550 | C | 74.49 | 15.5 | 7.5 | 0 | 0 | 0 | 0 |
| 46 | Example | 550 | B | 66.97 | 23.0 | 8.0 | 0.10 | 0 | 0 | 0.10 |
| 47 | Comparative Example | 600 | B | 64.84 | 25.0 | 7.6 | 0.15 | 0.10 | 0 | 0.25 |
| 48 | Example | 550 | B | 73.71 | 19.0 | 5.1 | 0.10 | 0 | 0 | 0.10 |
| 49 | Example | 550 | B | 71.37 | 19.0 | 7.0 | 0.10 | 0 | 0 | 0.10 |
| 50 | Example | 550 | B | 71.34 | 19.0 | 7.0 | 0.10 | 0 | 0 | 0.10 |
| 51 | Example | 550 | B | 71.00 | 19.0 | 7.0 | 0.10 | 0 | 0 | 0.10 |
| 52 | Comparative Example | 550 | C | 70.15 | 19.0 | 9.5 | 0.05 | 0 | 0 | 0.05 |
| 53 | Comparative Example | 550 | B | 74.35 | 18.0 | 6.0 | 0.50 | 0 | 0 | 0.50 |
| 54 | Comparative Example | 550 | B | 72.70 | 20.0 | 5.8 | 0 | 0 | 0 | 0 |
| 55 | Comparative Example | 550 | B | 69.70 | 16.5 | 12.0 | 0.10 | 0 | 0 | 0.10 |
| 56 | Comparative Example | 600 | B | 67.10 | 24.5 | 5.1 | 0.90 | 0 | 0 | 0.90 |
| 57 | Comparative Example | 600 | C | 62.90 | 29.0 | 5.1 | 0 | 0 | 0 | 0 |
| 58 | Comparative Example | 600 | B | <u>49.90</u> | 29.0 | 14.5 | 0.90 | 0 | 0 | 0.90 |
| 59 | Comparative Example | 550 | B | 77.00 | <u>15.0</u> | 6.0 | 0.20 | 0 | 0 | 0.20 |
| 60 | Comparative Example | 600 | B | 58.20 | <u>30.0</u> | 10.0 | 0.20 | 0 | 0 | 0.20 |

TABLE 2B-continued

| No. | Category | Bath temperature (° C.) | Production method | Plating layer Zn | Al | Mg | Element group A Sn | Bi | In | ΣA |
|---|---|---|---|---|---|---|---|---|---|---|
| 61 | Comparative Example | 550 | B | 73.20 | 20.0 | 5.0 | 0.20 | 0 | 0 | 0.20 |
| 62 | Comparative Example | 600 | B | 58.00 | 25.0 | 15.0 | 0.20 | 0 | 0 | 0.20 |
| 63 | Comparative Example | 550 | C | 69.30 | 20.0 | 8.0 | 1.00 | 0 | 0 | 1.00 |
| 64 | Comparative Example | 550 | B | 70.40 | 20.0 | 7.0 | 0.80 | 0.20 | 0 | 1.00 |
| 65 | Comparative Example | 550 | C | 69.40 | 20.0 | 8.0 | 0 | 1.00 | 0 | 1.00 |
| 66 | Comparative Example | 550 | B | 70.40 | 20.0 | 7.0 | 0 | 0.80 | 0.20 | 1.00 |
| 67 | Comparative Example | 550 | C | 69.40 | 20.0 | 8.0 | 0 | 0 | 1.00 | 1.00 |
| 68 | Comparative Example | 550 | B | 70.40 | 20.0 | 7.0 | 0.80 | 0 | 0.20 | 1.00 |
| 69 | Comparative Example | 550 | B | 71.50 | 19.0 | 7.5 | 0.20 | 0 | 0 | 0.20 |
| 70 | Comparative Example | 550 | B | 72.90 | 18.0 | 6.5 | 0.30 | 0 | 0 | 0.30 |
| 71 | Comparative Example | 550 | B | 71.50 | 19.0 | 7.5 | 0.20 | 0 | 0 | 0.20 |
| 72 | Comparative Example | 550 | B | 71.50 | 19.0 | 7.5 | 0.20 | 0 | 0 | 0.20 |
| 73 | Comparative Example | 550 | B | 71.50 | 19.0 | 7.5 | 0.20 | 0 | 0 | 0.20 |
| 74 | Comparative Example | 550 | B | 71.50 | 19.0 | 7.5 | 0.20 | 0 | 0 | 0.20 |
| 75 | Comparative Example | 550 | B | 72.10 | 19.0 | 7.5 | 0.20 | 0 | 0 | 0.20 |
| 76 | Comparative Example | 550 | B | 71.50 | 19.0 | 7.5 | 0.20 | 0 | 0 | 0.20 |
| 77 | Comparative Example | 550 | B | 71.50 | 19.0 | 7.5 | 0.20 | 0 | 0 | 0.20 |
| 78 | Comparative Example | 550 | B | 71.50 | 19.0 | 7.5 | 0.20 | 0 | 0 | 0.20 |

The amount of elements in the table is an average chemical composition, and the unit is mass %.

The remainder in the average chemical composition of the plating layer in the table is impurities.

The underlined part indicates that it is outside the scope of the present invention.

TABLE 3A

| No. | Plating layer Element group B Ca | Y | La | Ce | Sr | ΣB | Si |
|---|---|---|---|---|---|---|---|
| 1 | 0.10 | 0 | 0 | 0 | 0 | 0.10 | 0.60 |
| 2 | 0.21 | 0 | 0 | 0 | 0 | 0.21 | 0.63 |
| 3 | 0.57 | 0 | 0 | 0 | 0 | 0.57 | 2.90 |
| 4 | 0.16 | 0 | 0 | 0 | 0 | 0.16 | 0.51 |
| 5 | 0.16 | 0 | 0 | 0 | 0 | 0.16 | 0.51 |
| 6 | 0.16 | 0 | 0 | 0 | 0 | 0.16 | 0.51 |
| 7 | 0.16 | 0 | 0 | 0 | 0 | 0.16 | 0.51 |
| 8 | 0.16 | 0 | 0 | 0 | 0 | 0.16 | 0.51 |
| 9 | 0.16 | 0 | 0 | 0 | 0 | 0.16 | 0.51 |
| 10 | 0.16 | 0 | 0 | 0 | 0 | 0.16 | 0.51 |
| 11 | 0.16 | 0 | 0 | 0 | 0 | 0.16 | 0.51 |
| 12 | 0.16 | 0 | 0 | 0 | 0 | 0.16 | 0.51 |
| 13 | 0.16 | 0 | 0 | 0 | 0 | 0.16 | 0.51 |
| 14 | 0.11 | 0 | 0 | 0 | 0 | 0.11 | 0.63 |
| 15 | 0.04 | 0 | 0 | 0 | 0 | 0.04 | 0.63 |
| 16 | 0.04 | 0 | 0 | 0 | 0 | 0.04 | 0.63 |
| 17 | 0.04 | 0 | 0 | 0 | 0 | 0.04 | 0.63 |
| 18 | 0.04 | 0 | 0 | 0 | 0 | 0.04 | 0.63 |
| 19 | 0.04 | 0 | 0 | 0 | 0 | 0.04 | 0.63 |
| 20 | 0.04 | 0 | 0 | 0 | 0 | 0.04 | 0.63 |
| 21 | 0.04 | 0 | 0 | 0 | 0 | 0.04 | 0.63 |
| 22 | 0.04 | 0 | 0 | 0 | 0 | 0.04 | 0.63 |
| 23 | 0.04 | 0 | 0 | 0 | 0 | 0.04 | 0.63 |
| 24 | 0.04 | 0 | 0 | 0 | 0 | 0.04 | 0.63 |
| 25 | 0.027 | 0 | 0 | 0 | 0 | 0.03 | 0.63 |
| 26 | 0.20 | 0 | 0 | 0 | 0 | 0.20 | 1.80 |
| 27 | 0 | 0 | 0.027 | 0 | 0 | 0.03 | 0.63 |
| 28 | 0.027 | 0 | 0 | 0 | 0 | 0.03 | 0.63 |
| 29 | 0 | 0 | 0 | 0.027 | 0 | 0.03 | 0.63 |
| 30 | 0 | 0 | 0 | 0 | 0.027 | 0.03 | 0.63 |
| 31 | 0 | 0.20 | 0.01 | 0 | 0 | 0.21 | 1.60 |
| 32 | 0 | 0.20 | 0.01 | 0 | 0 | 0.21 | 1.60 |
| 33 | 0 | 0.20 | 0.01 | 0 | 0 | 0.21 | 1.60 |
| 34 | 0 | 0.20 | 0.01 | 0 | 0 | 0.21 | 1.60 |

The amount of elements in the table is an average chemical composition, and the unit is mass %.

The remainder in the average chemical composition of the plating layer in the table is impurities.

The underlined part indicates that it is outside the scope of the present invention.

TABLE 3B

| No. | Plating layer Element group B Ca | Y | La | Ce | Sr | ΣB | Si |
|---|---|---|---|---|---|---|---|
| 35 | 0 | 0.20 | 0.01 | 0 | 0 | 0.21 | 1.60 |
| 36 | 0.10 | 0 | 0 | 0 | 0 | 0.10 | 0.80 |
| 37 | 0.13 | 0 | 0 | 0 | 0 | 0.13 | 1.20 |
| 38 | 0.10 | 0.01 | 0.01 | 0.01 | 0 | 0.13 | 3.00 |
| 39 | 0.26 | 0 | 0 | 0 | 0 | 0.26 | 3.40 |
| 40 | 0.25 | 0 | 0 | 0 | 0 | 0.25 | 3.00 |
| 41 | 0 | 0.10 | 0.10 | 0.10 | 0 | 0.30 | 2.30 |
| 42 | 0 | 0 | 0.10 | 0.10 | 0.10 | 0.30 | 2.30 |
| 43 | 0.13 | 0 | 0 | 0 | 0 | 0.13 | 3.00 |
| 44 | 0.10 | 0 | 0 | 0 | 0 | 0.10 | 0.60 |
| 45 | 0 | 0.05 | 0 | 0.05 | 0 | 0.10 | 0.51 |
| 46 | 0 | 0 | 0.10 | 0.13 | 0 | 0.23 | 1.20 |
| 47 | 0.30 | 0 | 0 | 0 | 0 | 0.30 | 1.51 |
| 48 | 0.03 | 0 | 0 | 0 | 0 | 0.03 | 0.26 |
| 49 | 0 | 0 | 0 | 0.10 | 0 | 0.10 | 1.60 |
| 50 | 0 | 0 | 0 | 0 | 0.13 | 0.13 | 1.60 |
| 51 | 0 | 0 | 0 | 0.10 | 0 | 0.10 | 1.60 |
| 52 | 0.20 | 0 | 0 | 0 | 0 | 0.20 | 0.50 |
| 53 | 0.05 | 0 | 0 | 0 | 0 | 0.05 | 0.30 |
| 54 | 0.20 | 0 | 0 | 0 | 0 | 0.20 | 0.50 |
| 55 | 0.50 | 0 | 0 | 0 | 0 | 0.50 | 0.50 |
| 56 | 0.20 | 0 | 0 | 0 | 0 | 0.20 | 1.60 |
| 57 | 0.10 | 0 | 0 | 0 | 0 | 0.10 | 2.40 |
| 58 | 0.50 | 0 | 0 | 0 | 0 | 0.50 | 3.00 |
| 59 | 0.10 | 0 | 0 | 0 | 0 | 0.10 | 0.90 |
| 60 | 0.10 | 0 | 0 | 0 | 0 | 0.10 | 0.90 |
| 61 | 0.10 | 0 | 0 | 0 | 0 | 0.10 | 0.60 |
| 62 | 0.20 | 0 | 0 | 0 | 0 | 0.20 | 0.90 |
| 63 | 0.30 | 0 | 0 | 0 | 0 | 0.30 | 0.80 |
| 64 | 0.30 | 0 | 0 | 0 | 0 | 0.30 | 0.60 |
| 65 | 0.30 | 0 | 0 | 0 | 0 | 0.30 | 0.60 |
| 66 | 0.30 | 0 | 0 | 0 | 0 | 0.30 | 0.60 |
| 67 | 0.30 | 0 | 0 | 0 | 0 | 0.30 | 0.60 |
| 68 | 0.30 | 0 | 0 | 0 | 0 | 0.30 | 0.60 |
| 69 | 0.60 | 0 | 0 | 0 | 0 | 0.60 | 0.90 |
| 70 | 0.90 | 0 | 0 | 0 | 0 | 0.90 | 0.90 |

TABLE 3B-continued

| | Plating layer | | | | | | |
|---|---|---|---|---|---|---|---|
| | Element group B | | | | | | |
| No. | Ca | Y | La | Ce | Sr | ΣB | Si |
| 71 | 0 | <u>0.60</u> | 0 | 0 | 0 | <u>0.60</u> | 0.90 |
| 72 | 0 | 0 | <u>0.60</u> | 0 | 0 | <u>0.60</u> | 0.90 |
| 73 | 0 | 0 | 0 | <u>0.60</u> | 0 | <u>0.60</u> | 0.90 |
| 74 | 0 | 0 | 0 | 0 | <u>0.60</u> | <u>0.60</u> | 0.90 |
| 75 | 0 | 0 | 0 | 0 | 0 | <u>0</u> | 0.90 |
| 76 | 0.20 | 0.20 | 0.20 | 0 | 0 | 0.60 | 0.90 |
| 77 | 0 | 0 | 0.20 | 0.20 | 0.20 | <u>0.60</u> | 0.90 |
| 78 | 0.20 | 0 | 0.20 | 0 | 0.20 | <u>0.60</u> | 0.90 |

The amount of elements in the table is an average chemical composition, and the unit is mass %.
The remainder in the average chemical composition of the plating layer in the table is impurities.
The underlined part indicates that it is outside the scope of the present invention.

TABLE 4A

| | Plating layer Element group C | | | | | | | | | | | | |
|---|---|---|---|---|---|---|---|---|---|---|---|---|---|
| No. | Cr | Ti | Ni | Co | V | Nb | Zr | Mo | W | Ag | Cu | Mn | Fe |
| 1 | 0 | 0 | 0 | 0 | 0 | 0 | 0 | 0 | 0 | 0 | 0 | 0 | 1.0 |
| 2 | 0.01 | 0 | 0 | 0 | 0 | 0 | 0 | 0 | 0 | 0 | 0 | 0 | 1.2 |
| 3 | 0 | 0.01 | 0 | 0 | 0 | 0 | 0 | 0 | 0 | 0 | 0 | 0 | 0.3 |
| 4 | 0 | 0 | 0 | 0 | 0 | 0 | 0 | 0 | 0 | 0 | 0 | 0 | 0.8 |
| 5 | 0 | 0 | 0 | 0 | 0 | 0 | 0 | 0 | 0 | 0 | 0 | 0 | 0.8 |
| 6 | 0 | 0 | 0 | 0 | 0 | 0 | 0 | 0 | 0 | 0 | 0 | 0 | 0.8 |
| 7 | 0 | 0 | 0 | 0 | 0 | 0 | 0 | 0 | 0 | 0 | 0 | 0 | 0.8 |
| 8 | 0 | 0 | 0 | 0 | 0 | 0 | 0 | 0 | 0 | 0 | 0 | 0 | 0.8 |
| 9 | 0 | 0 | 0 | 0 | 0 | 0 | 0 | 0 | 0 | 0 | 0 | 0 | 0.8 |
| 10 | 0 | 0 | 0 | 0 | 0 | 0 | 0 | 0 | 0 | 0 | 0 | 0 | 0.8 |
| 11 | 0 | 0 | 0 | 0 | 0 | 0 | 0 | 0 | 0 | 0 | 0 | 0 | 0.8 |
| 12 | 0 | 0 | 0 | 0 | 0 | 0 | 0 | 0 | 0 | 0 | 0 | 0 | 0.8 |
| 13 | 0 | 0 | 0 | 0 | 0 | 0 | 0 | 0 | 0 | 0 | 0 | 0 | 0.8 |
| 14 | 0 | 0 | 0.23 | 0 | 0 | 0 | 0 | 0 | 0 | 0 | 0 | 0 | 1.3 |
| 15 | 0 | 0 | 0 | 0 | 0 | 0 | 0 | 0 | 0 | 0 | 0 | 0 | 0.9 |
| 16 | 0 | 0 | 0 | 0 | 0 | 0 | 0 | 0 | 0 | 0 | 0 | 0 | 0.9 |
| 17 | 0 | 0 | 0 | 0 | 0 | 0 | 0 | 0 | 0 | 0 | 0 | 0 | 0.9 |
| 18 | 0 | 0 | 0 | 0 | 0 | 0 | 0 | 0 | 0 | 0 | 0 | 0 | 0.9 |
| 19 | 0 | 0 | 0 | 0 | 0 | 0 | 0 | 0 | 0 | 0 | 0 | 0 | 0.9 |
| 20 | 0 | 0 | 0 | 0 | 0 | 0 | 0 | 0 | 0 | 0 | 0 | 0 | 0.9 |
| 21 | 0 | 0 | 0 | 0 | 0 | 0 | 0 | 0 | 0 | 0 | 0 | 0 | 0.9 |
| 22 | 0 | 0 | 0 | 0 | 0 | 0 | 0 | 0 | 0 | 0 | 0 | 0 | 0.9 |
| 23 | 0 | 0 | 0 | 0 | 0 | 0 | 0 | 0 | 0 | 0 | 0 | 0 | 0.9 |
| 24 | 0 | 0 | 0 | 0 | 0 | 0 | 0 | 0 | 0 | 0 | 0 | 0 | 0.9 |
| 25 | 0 | 0 | 0 | 0 | 0 | 0 | 0 | 0 | 0 | 0 | 0 | 0 | 0.9 |
| 26 | 0 | 0 | 0.01 | 0 | 0 | 0 | 0 | 0 | 0 | 0 | 0 | 0 | 0.5 |
| 27 | 0 | 0 | 0 | 0 | 0 | 0 | 0 | 0 | 0 | 0 | 0 | 0 | 1.1 |
| 28 | 0.10 | 0 | 0 | 0 | 0 | 0 | 0 | 0 | 0 | 0 | 0 | 0 | 1.5 |
| 29 | 0 | 0 | 0 | 0 | 0 | 0 | 0 | 0 | 0 | 0 | 0 | 0 | 1.3 |
| 30 | 0 | 0 | 0 | 0 | 0 | 0 | 0 | 0 | 0 | 0 | 0 | 0 | 1.3 |
| 31 | 0 | 0.10 | 0 | 0 | 0.10 | 0 | 0 | 0 | 0 | 0 | 0 | 0 | 0.3 |
| 32 | 0 | 0.10 | 0 | 0 | 0 | 0.1 | 0 | 0 | 0 | 0 | 0 | 0 | 0.3 |
| 33 | 0 | 0.10 | 0 | 0 | 0 | 0 | 0.1 | 0 | 0 | 0 | 0 | 0 | 0.3 |
| 34 | 0 | 0.10 | 0 | 0 | 0 | 0 | 0 | 0 | 0.1 | 0 | 0 | 0 | 0.3 |

The amount of elements in the table is an average chemical composition, and the unit is mass %.
The remainder in the average chemical composition of the plating layer in the table is impurities.
The underlined part indicates that it is outside the scope of the present invention.

TABLE 4B

| | Plating layer Element group C | | | | | | | | | | | | |
|---|---|---|---|---|---|---|---|---|---|---|---|---|---|
| No. | Cr | Ti | Ni | Co | V | Nb | Zr | Mo | W | Ag | Cu | Mn | Fe |
| 35 | 0 | 0.10 | 0 | 0 | 0 | 0 | 0 | 0 | 0 | 0.1 | 0 | 0 | 0.3 |
| 36 | 0 | 0 | 0 | 0 | 0 | 0 | 0 | 0 | 0 | 0 | 0 | 0 | 0.7 |
| 37 | 0 | 0 | 0 | 0 | 0 | 0 | 0 | 0 | 0 | 0 | 0 | 0 | 0.5 |

TABLE 4B-continued

| | Plating layer Element group C | | | | | | | | | | | | |
|---|---|---|---|---|---|---|---|---|---|---|---|---|---|
| No. | Cr | Ti | Ni | Co | V | Nb | Zr | Mo | W | Ag | Cu | Mn | Fe |
| 38 | 0 | 0 | 0 | 0 | 0 | 0 | 0 | 0 | 0 | 0 | 0 | 0 | 0.2 |
| 39 | 0 | 0 | 0 | 0 | 0 | 0 | 0 | 0 | 0 | 0 | 0 | 0 | 0.3 |
| 40 | 0 | 0 | 0.10 | 0 | 0 | 0 | 0 | 0 | 0 | 0 | 0 | 0 | 0.3 |
| 41 | 0 | 0 | 0 | 0.10 | 0 | 0 | 0 | 0 | 0 | 0 | 0 | 0 | 0.3 |
| 42 | 0 | 0 | 0 | 0.10 | 0 | 0 | 0 | 0 | 0 | 0 | 0 | 0 | 0.3 |
| 43 | 0 | 0 | 0.05 | 0 | 0 | 0 | 0 | 0 | 0 | 0 | 0 | 0 | 0.3 |
| 44 | 0 | 0.23 | 0 | 0 | 0 | 0.10 | 0 | 0 | 0 | 0 | 0 | 0 | 1.3 |
| 45 | 0 | 0 | 0 | 0 | 0 | 0 | 0 | 0 | 0 | 0 | 0 | 0 | 1.9 |
| 46 | 0 | 0 | 0 | 0 | 0 | 0 | 0 | 0 | 0 | 0 | 0 | 0 | 0.5 |
| 47 | 0 | 0 | 0 | 0 | 0 | 0 | 0 | 0 | 0 | 0 | 0 | 0 | 0.5 |
| 48 | 0 | 0 | 0 | 0 | 0 | 0 | 0 | 0 | 0 | 0 | 0 | 0 | 1.3 |
| 49 | 0.23 | 0 | 0 | 0 | 0 | 0 | 0 | 0 | 0 | 0 | 0.10 | 0 | 0.4 |
| 50 | 0.23 | 0 | 0 | 0 | 0 | 0 | 0 | 0 | 0 | 0 | 0.10 | 0 | 0.4 |
| 51 | 0 | 0 | 0 | 0 | 0 | 0 | 0 | 0 | 0 | 0 | 0 | 0.10 | 0.6 |
| 52 | 0 | 0 | 0 | 0 | 0 | 0 | 0 | 0 | 0 | 0 | 0 | 0 | 0.6 |
| 53 | 0 | 0 | 0 | 0 | 0 | 0 | 0 | 0 | 0 | 0 | 0 | 0 | 0.8 |
| 54 | 0 | 0 | 0 | 0 | 0 | 0 | 0 | 0 | 0 | 0 | 0 | 0 | 0.8 |
| 55 | 0 | 0 | 0 | 0 | 0 | 0 | 0 | 0 | 0 | 0 | 0 | 0 | 0.7 |
| 56 | 0 | 0 | 0 | 0 | 0 | 0 | 0 | 0 | 0 | 0 | 0 | 0 | 0.6 |
| 57 | 0 | 0 | 0 | 0 | 0 | 0 | 0 | 0 | 0 | 0 | 0 | 0 | 0.5 |
| 58 | 0 | 0 | 0.20 | 0 | 0 | 0 | 0 | 0 | 0 | 0 | 0 | 0 | 1.0 |
| 59 | 0 | 0 | 0 | 0 | 0 | 0 | 0 | 0 | 0 | 0 | 0 | 0 | 0.8 |
| 60 | 0 | 0 | 0 | 0 | 0 | 0 | 0 | 0 | 0 | 0 | 0 | 0 | 0.6 |
| 61 | 0 | 0 | 0 | 0 | 0 | 0 | 0 | 0 | 0 | 0 | 0 | 0 | 0.9 |
| 62 | 0 | 0 | 0 | 0 | 0 | 0 | 0 | 0 | 0 | 0 | 0 | 0 | 0.7 |
| 63 | 0 | 0 | 0 | 0 | 0 | 0 | 0 | 0 | 0 | 0 | 0 | 0 | 0.6 |
| 64 | 0 | 0 | 0 | 0 | 0 | 0 | 0 | 0 | 0 | 0 | 0 | 0 | 0.7 |
| 65 | 0 | 0 | 0 | 0 | 0 | 0 | 0 | 0 | 0 | 0 | 0 | 0 | 0.7 |
| 66 | 0 | 0 | 0 | 0 | 0 | 0 | 0 | 0 | 0 | 0 | 0 | 0 | 0.7 |
| 67 | 0 | 0 | 0 | 0 | 0 | 0 | 0 | 0 | 0 | 0 | 0 | 0 | 0.7 |
| 68 | 0 | 0 | 0 | 0 | 0 | 0 | 0 | 0 | 0 | 0 | 0 | 0 | 0.7 |
| 69 | 0 | 0 | 0 | 0 | 0 | 0 | 0 | 0 | 0 | 0 | 0 | 0 | 0.3 |
| 70 | 0 | 0 | 0 | 0 | 0 | 0 | 0 | 0 | 0 | 0 | 0 | 0 | 0.5 |
| 71 | 0 | 0 | 0 | 0 | 0 | 0 | 0 | 0 | 0 | 0 | 0 | 0 | 0.3 |
| 72 | 0 | 0 | 0 | 0 | 0 | 0 | 0 | 0 | 0 | 0 | 0 | 0 | 0.3 |
| 73 | 0 | 0 | 0 | 0 | 0 | 0 | 0 | 0 | 0 | 0 | 0 | 0 | 0.3 |
| 74 | 0 | 0 | 0 | 0 | 0 | 0 | 0 | 0 | 0 | 0 | 0 | 0 | 0.3 |
| 75 | 0 | 0 | 0 | 0 | 0 | 0 | 0 | 0 | 0 | 0 | 0 | 0 | 0.3 |
| 76 | 0 | 0 | 0 | 0 | 0 | 0 | 0 | 0 | 0 | 0 | 0 | 0 | 0.3 |
| 77 | 0 | 0 | 0 | 0 | 0 | 0 | 0 | 0 | 0 | 0 | 0 | 0 | 0.3 |
| 78 | 0 | 0 | 0 | 0 | 0 | 0 | 0 | 0 | 0 | 0 | 0 | 0 | 0.3 |

The amount of elements in the table is an average chemical composition, and the unit is mass %.
The remainder in the average chemical composition of the plating layer in the table is impurities.
The underlined part indicates that it is outside the scope of the present invention.

TABLE 5A

| | Plating layer | | | | | | |
|---|---|---|---|---|---|---|---|
| | Element group D | | | | Formula 1 | Formula 2 | |
| No. | Sb | Pb | B | P | Mg/Si | Si/ΣB | Formula 3 |
| 1 | 0 | 0 | 0 | 0 | 10.0 | 6.0 | 60.0 |
| 2 | 0 | 0 | 0 | 0 | 19.8 | 3.0 | 59.5 |
| 3 | 0 | 0 | 0 | 0 | 5.1 | 5.1 | 26.1 |
| 4 | 0 | 0 | 0 | 0 | 10.0 | 3.2 | 31.9 |
| 5 | 0 | 0 | 0 | 0 | 10.0 | 3.2 | 31.9 |
| 6 | 0 | 0 | 0 | 0 | 10.0 | 3.2 | 31.9 |
| 7 | 0 | 0 | 0 | 0 | 10.0 | 3.2 | 31.9 |
| 8 | 0 | 0 | 0 | 0 | 10.0 | 3.2 | 31.9 |
| 9 | 0 | 0 | 0 | 0 | 10.0 | 3.2 | 31.9 |
| 10 | 0 | 0 | 0 | 0 | 10.0 | 3.2 | 31.9 |
| 11 | 0 | 0 | 0 | 0 | 10.0 | 3.2 | 31.9 |
| 12 | 0 | 0 | 0 | 0 | 10.0 | 3.2 | 31.9 |
| 13 | 0 | 0 | 0 | 0 | 10.0 | 3.2 | 31.9 |
| 14 | 0 | 0 | 0 | 0 | 19.8 | 5.7 | 113.6 |
| 15 | 0 | 0 | 0 | 0.1 | 19.8 | 15.8 | 312.5 |
| 16 | 0 | 0 | 0 | 0.1 | 19.8 | 15.8 | 312.5 |
| 17 | 0 | 0 | 0 | 0.1 | 19.8 | 15.8 | 312.5 |
| 18 | 0 | 0 | 0 | 0.1 | 19.8 | 15.8 | 312.5 |
| 19 | 0 | 0 | 0 | 0.1 | 19.8 | 15.8 | 312.5 |
| 20 | 0 | 0 | 0 | 0.1 | 19.8 | 15.8 | 312.5 |
| 21 | 0 | 0 | 0 | 0.1 | 19.8 | 15.8 | 312.5 |
| 22 | 0 | 0 | 0 | 0.1 | 19.8 | 15.8 | 312.5 |
| 23 | 0 | 0 | 0 | 0.1 | 19.8 | 15.8 | 312.5 |
| 24 | 0 | 0 | 0 | 0.1 | 19.8 | 15.8 | 312.5 |
| 25 | 0 | 0 | 0 | 0 | 19.8 | 23.3 | 463.0 |
| 26 | 0 | 0 | 0 | 0.5 | 8.2 | 9.0 | 74.0 |
| 27 | 0.1 | 0 | 0 | 0 | 15.9 | 23.3 | 370.4 |
| 28 | 0 | 0 | 0 | 0 | 11.1 | 23.3 | 259.3 |
| 29 | 0 | 0 | 0 | 0 | 8.1 | 23.3 | 188.9 |
| 30 | 0 | 0 | 0 | 0 | 8.1 | 23.3 | 188.9 |
| 31 | 0 | 0 | 0 | 0 | 3.5 | 7.6 | 26.7 |
| 32 | 0 | 0 | 0 | 0 | 3.4 | 7.6 | 26.2 |
| 33 | 0 | 0 | 0 | 0 | 3.5 | 7.6 | 26.7 |
| 34 | 0 | 0 | 0 | 0 | 3.5 | 7.6 | 26.7 |

The amount of elements in the table is an average chemical composition, and the unit is mass %.

The remainder in the average chemical composition of the plating layer in the table is impurities.

The underlined part indicates that it is outside the scope of the present invention.

TABLE 5B

| | Plating layer | | | | | | |
|---|---|---|---|---|---|---|---|
| | Element group D | | | | Formula 1 | Formula 2 | |
| No. | Sb | Pb | B | P | Mg/Si | Si/ΣB | Formula 3 |
| 35 | 0 | 0 | 0 | 0 | 3.5 | 7.6 | 26.7 |
| 36 | 0 | 0 | 0 | 0 | 8.1 | 8.0 | 65.0 |
| 37 | 0 | 0 | 0 | 0 | 5.9 | 9.2 | 54.6 |
| 38 | 0 | 0 | 0.5 | 0 | 2.1 | 23.1 | 47.7 |
| 39 | 0 | 0 | 0 | 0 | 2.0 | 13.1 | 26.2 |
| 40 | 0 | 0 | 0 | 0 | 4.0 | 12.0 | 48.0 |
| 41 | 0 | 0 | 0 | 0 | 4.3 | 7.7 | 33.3 |
| 42 | 0 | 0 | 0 | 0 | 4.3 | 7.7 | 33.3 |
| 43 | 0 | 0 | 0 | 0 | 4.2 | 23.1 | 96.2 |
| 44 | 0 | 0.1 | 0 | 0 | 12.5 | 6.0 | 75.0 |
| 45 | 0 | 0 | 0 | 0 | 14.7 | 5.1 | 75.0 |
| 46 | 0 | 0 | 0 | 0 | 6.7 | 5.2 | 34.8 |
| 47 | 0 | 0 | 0 | 0 | 5.0 | 5.0 | 25.3 |
| 48 | 0 | 0.5 | 0 | 0 | 19.6 | 8.7 | 170.0 |
| 49 | 0 | 0 | 0.1 | 0 | 4.4 | 16.0 | 70.0 |
| 50 | 0 | 0 | 0.1 | 0 | 4.4 | 12.3 | 53.8 |
| 51 | 0.5 | 0 | 0 | 0 | 4.4 | 16.0 | 70.0 |
| 52 | 0 | 0 | 0 | 0 | 19.0 | 2.5 | 47.5 |
| 53 | 0 | 0 | 0 | 0 | 20.0 | 6.0 | 120.0 |
| 54 | 0 | 0 | 0 | 0 | 11.6 | 2.5 | 29.0 |
| 55 | 0 | 0 | 0 | 0 | 24.0 | 1.0 | 24.0 |
| 56 | 0 | 0 | 0 | 0 | 3.2 | 8.0 | 25.5 |
| 57 | 0 | 0 | 0 | 0 | 2.1 | 24.0 | 51.0 |
| 58 | 0.5 | 0 | 0 | 0.5 | 4.8 | 6.0 | 29.0 |
| 59 | 0 | 0 | 0 | 0 | 6.7 | 9.0 | 60.0 |
| 60 | 0 | 0 | 0 | 0 | 11.1 | 9.0 | 100.0 |
| 61 | 0 | 0 | 0 | 0 | 8.3 | 6.0 | 50.0 |
| 62 | 0 | 0 | 0 | 0 | 16.7 | 4.5 | 75.0 |
| 63 | 0 | 0 | 0 | 0 | 10.0 | 2.7 | 26.7 |
| 64 | 0 | 0 | 0 | 0 | 11.7 | 2.0 | 23.3 |
| 65 | 0 | 0 | 0 | 0 | 13.3 | 2.0 | 26.7 |
| 66 | 0 | 0 | 0 | 0 | 11.7 | 2.0 | 23.3 |
| 67 | 0 | 0 | 0 | 0 | 13.3 | 2.0 | 26.7 |
| 68 | 0 | 0 | 0 | 0 | 11.7 | 2.0 | 23.3 |
| 69 | 0 | 0 | 0 | 0 | 8.3 | 1.5 | 12.5 |
| 70 | 0 | 0 | 0 | 0 | 7.2 | 1.0 | 7.2 |
| 71 | 0 | 0 | 0 | 0 | 8.3 | 1.5 | 12.5 |
| 72 | 0 | 0 | 0 | 0 | 8.3 | 1.5 | 12.5 |
| 73 | 0 | 0 | 0 | 0 | 8.3 | 1.5 | 12.5 |
| 74 | 0 | 0 | 0 | 0 | 8.3 | 1.5 | 12.5 |
| 75 | 0 | 0 | 0 | 0 | 8.3 | — | — |
| 76 | 0 | 0 | 0 | 0 | 8.3 | 1.5 | 12.5 |
| 77 | 0 | 0 | 0 | 0 | 8.3 | 1.5 | 12.5 |
| 78 | 0 | 0 | 0 | 0 | 8.3 | 1.5 | 12.5 |

The amount of elements in the table is an average chemical composition, and the unit is mass %.

The remainder in the average chemical composition of the plating layer in the table is impurities.

The underlined part indicates that it is outside the scope of the present invention.

TABLE 6A

| | Plating layer | | | | Evaluation | | | |
|---|---|---|---|---|---|---|---|---|
| No. | BG Adopted value | Formula 4 R1 | Formula 9 Si/ΣA | Formula 6 R2 | Corrosion resistance of flat part | Sacrificial corrosion resistance | Short term corrosion appearance | Long term corrosion appearance |
| 1 | 27° | 10.2 | 60.0 | 2.1 | A | A | S | S |
| 2 | 27° | 2.8 | 21.0 | 2.1 | A | A | AAA | A |
| 3 | 27° | 2.9 | 58.0 | 2.1 | A | A | AAA | A |
| 4 | 27° | 3.9 | 6.4 | 2.1 | AA | AAA | S | A |
| 5 | 27° | 2.6 | 6.4 | 2.1 | A | A | A | A |
| 6 | 27° | 2.0 | 6.4 | 2.0 | B | B | B | B |
| 7 | 27° | 2.0 | 6.4 | 2.1 | B | B | B | B |
| 8 | 27° | 2.0 | 6.4 | 2.2 | B | B | B | B |
| 9 | 27° | 2.0 | 6.4 | 2.1 | B | B | B | B |
| 10 | 27° | 2.0 | 6.4 | 2.1 | B | B | B | B |
| 11 | 27° | 2.7 | 6.4 | 2.2 | A | A | A | A |
| 12 | 27° | 2.6 | 6.4 | 2.1 | A | A | A | A |
| 13 | 27° | 2.0 | 6.4 | 2.1 | B | B | B | B |
| 14 | 27° | 3.8 | 5.7 | 2.1 | A | AAA | S | A |
| 15 | 27° | 2.6 | 4.5 | 2.2 | AA | AAA | A | A |
| 16 | 27° | 2.6 | 4.5 | 2.1 | A | A | A | A |
| 17 | 27° | 2.1 | 4.5 | 2.2 | B | B | B | B |
| 18 | 27° | 2.0 | 4.5 | 2.2 | B | B | B | B |
| 19 | 27° | 2.2 | 4.5 | 2.2 | B | B | B | B |
| 20 | 27° | 2.0 | 4.5 | 2.2 | B | B | B | B |
| 21 | 27° | 2.0 | 4.5 | 2.2 | B | B | B | B |
| 22 | 27° | 2.7 | 4.5 | 2.2 | A | A | A | A |
| 23 | 27° | 2.6 | 4.5 | 2.2 | A | A | A | A |
| 24 | 27° | 2.2 | 4.5 | 2.2 | B | B | B | B |
| 25 | 27° | 2.0 | 7.9 | 2.2 | B | B | B | B |
| 26 | 585 | 8.6 | 6.0 | 2.9 | AA | AAA | S | AAA |
| 27 | 27° | 2.7 | 1.6 | 2.2 | AA | A | AA | A |
| 28 | 585 | 2.9 | 1.6 | 2.3 | AA | A | AAA | A |
| 29 | 27° | 3.4 | 7.9 | 7.9 | A | AA | S | A |
| 30 | 27° | 3.4 | 7.0 | 7.9 | A | AA | S | A |
| 31 | 585 | 2.9 | 14.5 | 5.3 | AA | A | AAA | A |
| 32 | 585 | 2.9 | 14.5 | 5.3 | AA | A | AAA | A |

TABLE 6A-continued

| No. | BG Adopted value | Formula 4 R1 | Formula 9 Si/ΣA | Formula 6 R2 | Corrosion resistance of flat part | Sacrificial corrosion resistance | Short term corrosion appearance | Long term corrosion appearance |
|---|---|---|---|---|---|---|---|---|
| | | | Plating layer | | | Evaluation | | |
| 33 | 585 | 2.9 | 14.5 | 5.3 | AA | A | AAA | A |
| 34 | 585 | 2.9 | 14.5 | 5.3 | AA | A | AAA | A |

The underlined part indicates that it is outside the scope of the present invention.

TABLE 6B

| No. | BG Adopted value | Formula 4 R1 | Formula 9 Si/ΣA | Formula 6 R2 | corrosion resistance of flat part | sacrificial corrosion resistance | short term corrosion appearance | long term corrosion appearance |
|---|---|---|---|---|---|---|---|---|
| | | | Plating layer | | | Evaluation | | |
| 35 | 585 | 2.9 | 14.5 | 5.3 | AA | A | AAA | A |
| 36 | 27° | 10.9 | 8.0 | 10.3 | A | AA | S | S |
| 37 | 27° | 3.6 | 12.0 | 11.0 | A | A | S | A |
| 38 | 27° | 2.8 | 30.0 | 3.7 | AA | A | AAA | A |
| 39 | 27° | 2.9 | 6.8 | 2.6 | A | AAA | AAA | A |
| 40 | 27° | 3.0 | 30.0 | 2.8 | AA | A | AAA | A |
| 41 | 27° | 3.2 | — | 4.9 | AA | A | S | A |
| 42 | 27° | 3.2 | — | 4.9 | AA | A | S | A |
| 43 | 27° | 2.9 | 5.0 | 2.6 | AAA | AAA | AAA | A |
| 44 | 585 | 8.0 | 6.0 | 2.2 | AAA | AAA | S | AAA |
| 45 | 27° | 7.6 | — | 2.1 | A | A | S | AAA |
| 46 | 27° | 4.5 | 12.0 | 2.3 | A | A | S | AA |
| 47 | 27° | <u>2.0</u> | 6.0 | 2.3 | B | B | B | B |
| 48 | 27° | <u>2.9</u> | 2.6 | 2.3 | A | A | AAA | A |
| 49 | 585 | 3.1 | 16.0 | 7.9 | AAA | A | AAA | A |
| 50 | 585 | 3.1 | 16.0 | 7.9 | AAA | A | AAA | A |
| 51 | 27° | 3.2 | 16.0 | 2.1 | AA | A | AAA | A |
| 52 | 27° | <u>2.0</u> | 10.0 | 2.2 | B | B | B | B |
| 53 | 27° | <u>2.1</u> | 0.6 | 2.3 | B | B | B | B |
| 54 | 27° | <u>2.0</u> | — | 2.1 | B | B | B | B |
| 55 | 27° | <u>2.1</u> | 5.0 | 2.2 | B | B | B | B |
| 56 | 27° | <u>2.0</u> | 1.8 | 2.1 | B | B | B | B |
| 57 | 27° | <u>2.0</u> | — | 2.1 | B | B | B | B |
| 58 | 585 | <u>2.2</u> | 3.3 | 2.1 | B | B | B | B |
| 59 | 27° | <u>2.2</u> | 4.5 | 2.1 | B | B | B | B |
| 60 | 27° | <u>2.1</u> | 4.5 | 2.1 | B | B | B | B |
| 61 | 27° | <u>2.1</u> | 3.0 | 2.1 | B | B | B | B |
| 62 | 27° | <u>2.0</u> | 4.5 | 2.1 | B | B | B | B |
| 63 | 27° | <u>2.4</u> | 0.8 | 2.1 | B | B | B | B |
| 64 | 27° | <u>2.0</u> | 0.6 | 2.1 | B | B | B | B |
| 65 | 27° | <u>2.0</u> | 0.6 | 2.3 | B | B | B | B |
| 66 | 27° | <u>2.0</u> | 0.6 | 2.2 | B | B | B | B |
| 67 | 27° | <u>2.0</u> | 0.6 | 2.1 | B | B | B | B |
| 68 | 27° | <u>2.0</u> | 0.6 | 2.3 | B | B | B | B |
| 69 | 27° | <u>2.0</u> | 4.5 | 2.1 | B | B | B | B |
| 70 | 27° | <u>2.0</u> | 3.0 | 2.1 | B | B | B | B |
| 71 | 27° | <u>2.0</u> | 4.5 | 2.1 | B | B | B | B |
| 72 | 27° | <u>2.0</u> | 4.5 | 2.1 | B | B | B | B |
| 73 | 27° | <u>2.0</u> | 4.5 | 2.1 | B | B | B | B |
| 74 | 27° | <u>2.0</u> | 4.5 | 2.1 | B | B | B | B |
| 75 | 27° | <u>2.0</u> | 4.5 | 2.1 | B | B | B | B |
| 76 | 27° | <u>2.0</u> | 4.5 | 2.1 | B | B | B | B |
| 77 | 27° | <u>2.0</u> | 4.5 | 2.1 | B | B | B | B |
| 78 | 27° | <u>2.0</u> | 4.5 | 2.1 | B | B | B | B |

The underlined part indicates that it is outside the scope of the present invention.

INDUSTRIAL APPLICABILITY

According to the present invention, since it is possible to provide a Zn-based plated steel material with little change in appearance particularly over a long time, the present invention has industrial applicability.

The invention claimed is:
1. A plated steel material having a plating layer on a surface of a steel material,
wherein the plating layer has an average chemical composition consisting of, in mass %,
Zn: more than 50.00%,
Al: more than 15.0% and less than 30.0%,
Mg: more than 5.0% and less than 15.0%,

Si: 0.25% or more and less than 3.50%,
Sn: 0% or more and less than 1.00%,
Bi: 0% or more and less than 1.00%,
In: 0% or more and less than 1.00%,
Ca: 0% or more and less than 0.60%,
Y: 0% or more and less than 0.60%,
La: 0% or more and less than 0.60%,
Ce: 0% or more and less than 0.60%,
Sr: 0% or more and less than 0.60%,
Cr: 0% or more and less than 0.25%,
Ti: 0% or more and less than 0.25%,
Ni: 0% or more and less than 0.25%,
Co: 0% or more and less than 0.25%,
V: 0% or more and less than 0.25%,
Nb: 0% or more and less than 0.25%,
Zr: 0% or more and less than 0.25%,
Mo: 0% or more and less than 0.25%,
W: 0% or more and less than 0.25%,
Ag: 0% or more and less than 0.25%,
Cu: 0% or more and less than 0.25%,
Mn: 0% or more and less than 0.25%,
Fe: 0% or more and less than 5.0%,
Sb: 0% or more and 0.5% or less,
Pb: 0% or more and 0.5% or less,
B: 0% or more and 0.5% or less,
P: 0% or more and 0.5% or less, and
impurities, and
  wherein a total amount of Zn, Al and Mg is more than 96%,
  a total amount ($\Sigma$A) of at least one selected from the group consisting of Sn, Bi and In is less than 1.00%,
  a total amount ($\Sigma$B) of at least one selected from the group consisting of Ca, Y, La, Ce and Sr is 0.02% or more and less than 0.60%,
  the amount of Mg, the amount of Si and $\Sigma$B satisfy the following Formula 1 to Formula 3, and
  in an X-ray diffraction pattern of the surface of the plating layer measured using a Cu-K$\alpha$ ray under conditions of an X-ray output of 40 kV and 150 mA, a diffraction intensity ratio R1 defined by the following Formula 4 satisfies the following Formula 5:

$2.0 \leq Mg/Si < 20.0$   Formula 1

$3.0 \leq Si/\Sigma B < 24.0$   Formula 2

$26.0 \leq (Si/\Sigma B) \times (Mg/Si) < 375.0$   Formula 3

$R1 = \{I(16.18°) + I(32.69°)\}/I(27.0°)$   Formula 4

$2.5 < R1$   Formula 5 where, Si and Mg in Formula 1 to Formula 3 are the average composition (mass %) of Si and Mg in the plating layer, in Formula 4, I(16.18°) is a diffraction intensity (cps) at 2θ=16.18° in the X-ray diffraction pattern, I(32.69°) is a diffraction intensity (cps) at 2θ=32.69° in the X-ray diffraction pattern, and I(27.0°) is a diffraction intensity (cps) at 2θ=27.0° in the X-ray diffraction pattern, and when a diffraction peak with an intensity of 1,000 cps or more appears at 2θ=27.0°, I(27.0°) in Formula 4 is 585 cps.

2. The plated steel material according to claim 1,
  wherein, in an X-ray diffraction pattern of the surface of the plating layer measured using a Cu-K$\alpha$ ray under conditions of an X-ray output of 40 kV and 150 mA, a diffraction intensity ratio R2 defined by the following Formula 6 satisfies the following Formula 7:

$R2 = \{I(24.24°) + I(28.07°)\}/I(27.0°)$   Formula 6

$2.5 < R2$   Formula 7 where, in Formula 6, I(24.24°) is a diffraction intensity (cps) at 2θ=24.24° in the X-ray diffraction pattern, I(28.07°) is a diffraction intensity (cps) at 2θ=28.07° in the X-ray diffraction pattern, and I(27.0°) is a diffraction intensity (cps) at 2θ=27.0° in the X-ray diffraction pattern, and when a diffraction peak with an intensity of 1,000 cps or more appears at 2θ=27.0°, I(27.0°) in Formula 6 is 585 cps.

3. The plated steel material according to claim 2, wherein R1 defined by Formula 4 satisfies the following Formula 8:

$10 < R1$   Formula 8.

4. The plated steel material according to claim 3, which satisfies the following Formula 9:

$3.0 \leq Si/\Sigma A < 50.0$   Formula 9 where, Si in Formula 9 is the average composition (mass %) of Si in the plating layer.

5. The plated steel material according to claim 2, which satisfies the following Formula 9:

$3.0 \leq Si/\Sigma A < 50.0$   Formula 9 where, Si in Formula 9 is the average composition (mass %) of Si in the plating layer.

6. The plated steel material according to claim 1,
  wherein R1 defined by Formula 4 satisfies the following Formula 8:

$10 < R1$   Formula 8.

7. The plated steel material according to claim 6, which satisfies the following Formula 9:

$3.0 \leq Si/\Sigma A < 50.0$   Formula 9 where, Si in Formula 9 is the average composition (mass %) of Si in the plating layer.

8. The plated steel material according to claim 1, which satisfies the following Formula 9:

$3.0 \leq Si/\Sigma A < 50.0$   Formula 9 where, Si in Formula 9 is the average composition (mass %) of Si in the plating layer.

* * * * *